(12) United States Patent  
Liu et al.

(10) Patent No.: US 12,165,039 B2  
(45) Date of Patent: Dec. 10, 2024

(54) NEURAL NETWORK QUANTIZATION DATA PROCESSING METHOD, DEVICE, COMPUTER EQUIPMENT AND STORAGE MEDIUM

(71) Applicant: ANHUI CAMBRICON INFORMATION TECHNOLOGY CO., LTD., Anhui (CN)

(72) Inventors: Shaoli Liu, Anhui (CN); Xiaofu Meng, Anhui (CN); Xishan Zhang, Anhui (CN); Jiaming Guo, Anhui (CN)

(73) Assignee: ANHUI CAMBRICON INFORMATION TECHNOLOGY CO., LTD., Hefei (CN)

( * ) Notice: Subject to any disclaimer, the term of this patent is extended or adjusted under 35 U.S.C. 154(b) by 932 days.

(21) Appl. No.: 17/256,855

(22) PCT Filed: Aug. 20, 2020

(86) PCT No.: PCT/CN2020/110321  
§ 371 (c)(1),  
(2) Date: Dec. 29, 2020

(87) PCT Pub. No.: WO2021/036908  
PCT Pub. Date: Mar. 4, 2021

(65) Prior Publication Data  
US 2021/0374511 A1 Dec. 2, 2021

(30) Foreign Application Priority Data

Aug. 23, 2019 (CN) .......................... 201910786019.6  
Sep. 19, 2019 (CN) .......................... 201910889202.9

(51) Int. Cl.  
*G06N 3/06* (2006.01)  
*G06N 3/063* (2023.01)

(52) U.S. Cl.  
CPC .................................. *G06N 3/063* (2013.01)

(58) Field of Classification Search  
CPC ..................................................... G06N 3/063  
See application file for complete search history.

(56) References Cited

U.S. PATENT DOCUMENTS 5,052,043 A 9/1991 Gaborski  
6,704,757 B1 3/2004 Ohmi et al.  
(Continued)

FOREIGN PATENT DOCUMENTS

CN 1503858 A 6/2004  
CN 1503958 A 6/2004  
(Continued)

OTHER PUBLICATIONS

Li et al., "Using Artificial Neural Network for Predicting Thread Partitioning in Speculative Multithreading", IEEE, 2015, pp. 823-826.

(Continued)

*Primary Examiner* — Barbara M Level  
(74) *Attorney, Agent, or Firm* — Rimon PC

(57) ABSTRACT

The present disclosure provides a data processing method, a board card device, a computer equipment, and a storage medium for data quantization. The board card provided in the present disclosure includes a storage component, an interface device, a control component, and an artificial intelligence chip of a data processing device, where the artificial intelligence chip is connected to the storage device, the control device, and the interface apparatus, respectively. The storage component is configured to store data; the interface device is configured to implement data transmission between the artificial intelligence chip and an external equipment; and the control component is configured to monitor a state of the artificial intelligence chip. According (Continued)

to the data processing method, the device, the computer equipment, and the storage medium provided in the embodiments of the present disclosure, data to be quantized is quantized according to a corresponding quantization parameter, which may reduce the storage space of data while ensuring the precision, as well as ensure the accuracy and reliability of the operation result and improve the operation efficiency.

16 Claims, 5 Drawing Sheets

(56) References Cited

U.S. PATENT DOCUMENTS

| | | | |
|---|---|---|---|
| 6,715,065 | B1 | 3/2004 | Ebata et al. |
| 6,931,639 | B1 | 8/2005 | Eickemeyer |
| 7,242,414 | B1 | 7/2007 | Thekkath et al. |
| 7,406,451 | B2 | 7/2008 | Mrziglod et al. |
| 7,721,128 | B2 | 5/2010 | Johns et al. |
| 7,945,607 | B2 | 5/2011 | Hinds |
| 8,694,572 | B2 | 4/2014 | Samy et al. |
| 8,924,455 | B1 | 12/2014 | Barman et al. |
| 9,412,366 | B2 | 8/2016 | Wilensky et al. |
| 9,916,531 | B1* | 3/2018 | Zivkovic ............. G06N 3/063 |
| 10,187,568 | B1 | 1/2019 | Tran et al. |
| 10,224,954 | B1 | 3/2019 | Madduri et al. |
| 10,360,304 | B1 | 7/2019 | Alvarez et al. |
| 10,427,306 | B1 | 10/2019 | Quinlan et al. |
| 2002/0138714 | A1 | 9/2002 | Leibholz et al. |
| 2003/0167460 | A1 | 9/2003 | Desai et al. |
| 2005/0138327 | A1 | 6/2005 | Tabei |
| 2006/0161375 | A1 | 7/2006 | Duberstein et al. |
| 2009/0113186 | A1 | 4/2009 | Kato et al. |
| 2009/0125293 | A1 | 5/2009 | Lefurgy et al. |
| 2010/0073068 | A1 | 3/2010 | Cho et al. |
| 2011/0060587 | A1 | 3/2011 | Phillips et al. |
| 2011/0301777 | A1 | 12/2011 | Cox et al. |
| 2012/0316845 | A1 | 12/2012 | Grey et al. |
| 2013/0054110 | A1 | 2/2013 | Sata |
| 2013/0332610 | A1 | 12/2013 | Beveridge |
| 2014/0081625 | A1 | 3/2014 | Wilensky et al. |
| 2014/0164737 | A1 | 6/2014 | Collange et al. |
| 2014/0249814 | A1 | 9/2014 | Nakano et al. |
| 2015/0134581 | A1 | 5/2015 | Doeding et al. |
| 2015/0370303 | A1 | 12/2015 | Krishnaswamy et al. |
| 2016/0026231 | A1 | 1/2016 | Ignowski et al. |
| 2016/0054922 | A1 | 2/2016 | Awasthi et al. |
| 2016/0124710 | A1 | 5/2016 | Lutz et al. |
| 2016/0170866 | A1 | 6/2016 | Ioualalen et al. |
| 2016/0328645 | A1 | 11/2016 | Lin et al. |
| 2016/0328647 | A1* | 11/2016 | Lin ................. G06F 17/11 |
| 2017/0090956 | A1 | 3/2017 | Linsky |
| 2017/0103022 | A1 | 4/2017 | Kreinin et al. |
| 2017/0142327 | A1 | 5/2017 | Bayani |
| 2017/0161604 | A1 | 6/2017 | Craddock et al. |
| 2017/0221176 | A1 | 8/2017 | Munteanu et al. |
| 2017/0257079 | A1 | 9/2017 | Jain et al. |
| 2017/0262959 | A1 | 9/2017 | Lee et al. |
| 2017/0316307 | A1 | 11/2017 | Koster et al. |
| 2017/0316312 | A1 | 11/2017 | Goyal et al. |
| 2017/0344882 | A1 | 11/2017 | Ambrose et al. |
| 2017/0353163 | A1 | 12/2017 | Gazneli et al. |
| 2017/0357530 | A1 | 12/2017 | Shih et al. |
| 2017/0357910 | A1 | 12/2017 | Sommer et al. |
| 2018/0046903 | A1 | 2/2018 | Yao et al. |
| 2018/0075347 | A1* | 3/2018 | Alistarh ............. G06N 3/084 |
| 2018/0088996 | A1 | 3/2018 | Rossi et al. |
| 2018/0096243 | A1 | 4/2018 | Patil et al. |
| 2018/0157464 | A1 | 6/2018 | Lutz et al. |
| 2018/0288440 | A1 | 10/2018 | Chao |
| 2018/0293517 | A1 | 10/2018 | Browne et al. |
| 2018/0300931 | A1 | 10/2018 | Vembu et al. |
| 2018/0322391 | A1 | 11/2018 | Wu et al. |
| 2018/0357541 | A1 | 12/2018 | Chen et al. |
| 2018/0367729 | A1 | 12/2018 | Parasnis et al. |
| 2018/0373976 | A1 | 12/2018 | Woo |
| 2019/0012559 | A1 | 1/2019 | Desappan et al. |
| 2019/0042925 | A1 | 2/2019 | Choe et al. |
| 2019/0050710 | A1* | 2/2019 | Wang .............. G06N 3/063 |
| 2019/0057696 | A1 | 2/2019 | Ogawa |
| 2019/0114142 | A1 | 4/2019 | Yoda et al. |
| 2019/0122094 | A1 | 4/2019 | Chen et al. |
| 2019/0122119 | A1 | 4/2019 | Husain |
| 2019/0138372 | A1 | 5/2019 | Tee |
| 2019/0147322 | A1* | 5/2019 | Kim ................. G06N 3/063 706/16 |
| 2019/0164285 | A1 | 5/2019 | Nye et al. |
| 2019/0180170 | A1 | 6/2019 | Huang et al. |
| 2019/0199370 | A1 | 6/2019 | Madduri et al. |
| 2019/0220734 | A1 | 7/2019 | Ferdman et al. |
| 2019/0228762 | A1 | 7/2019 | Wang et al. |
| 2019/0251429 | A1 | 8/2019 | Du et al. |
| 2019/0265949 | A1 | 8/2019 | Ito |
| 2019/0278677 | A1 | 9/2019 | Terechko et al. |
| 2019/0294968 | A1 | 9/2019 | Vantrease et al. |
| 2019/0339937 | A1 | 11/2019 | Lo et al. |
| 2019/0385050 | A1* | 12/2019 | Wang ................ G06N 3/08 |
| 2020/0005424 | A1 | 1/2020 | Appu et al. |
| 2020/0097799 | A1 | 3/2020 | Divakar et al. |
| 2020/0097818 | A1* | 3/2020 | Li .................. G06N 3/08 |
| 2020/0117453 | A1 | 4/2020 | Zhang et al. |
| 2020/0117614 | A1 | 4/2020 | Zhang et al. |
| 2020/0125508 | A1 | 4/2020 | Liu et al. |
| 2020/0126554 | A1 | 4/2020 | Chen et al. |
| 2020/0126555 | A1 | 4/2020 | Chen et al. |
| 2020/0142748 | A1 | 5/2020 | Liu et al. |
| 2020/0159527 | A1 | 5/2020 | Zhang et al. |
| 2020/0159530 | A1 | 5/2020 | Zhang et al. |
| 2020/0159532 | A1 | 5/2020 | Zhang et al. |
| 2020/0159533 | A1 | 5/2020 | Zhang et al. |
| 2020/0160162 | A1 | 5/2020 | Zhang et al. |
| 2020/0160163 | A1 | 5/2020 | Liu et al. |
| 2020/0160219 | A1 | 5/2020 | Zhang et al. |
| 2020/0160220 | A1 | 5/2020 | Zhang et al. |
| 2020/0160221 | A1 | 5/2020 | Zhang et al. |
| 2020/0160222 | A1 | 5/2020 | Zhang et al. |
| 2020/0167632 | A1* | 5/2020 | Kim ................. G06F 13/28 |
| 2020/0168227 | A1 | 5/2020 | Chen et al. |
| 2020/0174547 | A1 | 6/2020 | Fang et al. |
| 2020/0183752 | A1 | 6/2020 | Liu et al. |
| 2020/0193273 | A1* | 6/2020 | Chung ............. G06F 17/16 |
| 2020/0202218 | A1* | 6/2020 | Csefalvay .......... G06N 3/084 |
| 2020/0241874 | A1 | 7/2020 | Chen et al. |
| 2020/0257972 | A1 | 8/2020 | Miniskar et al. |
| 2020/0302289 | A1* | 9/2020 | Ren .................. G06N 3/084 |
| 2020/0334041 | A1 | 10/2020 | Zhang et al. |
| 2020/0334522 | A1 | 10/2020 | Zhang et al. |
| 2020/0334572 | A1 | 10/2020 | Zhang et al. |
| 2020/0394522 | A1 | 12/2020 | Liu et al. |
| 2020/0394523 | A1 | 12/2020 | Liu et al. |
| 2021/0042889 | A1 | 2/2021 | Pei |
| 2021/0061028 | A1 | 3/2021 | Da Deppo et al. |
| 2021/0117768 | A1 | 4/2021 | Liu et al. |
| 2021/0117810 | A1 | 4/2021 | Liu |
| 2021/0182177 | A1 | 6/2021 | Su et al. |
| 2021/0264270 | A1 | 8/2021 | Liu et al. |
| 2021/0286688 | A1 | 9/2021 | Liu et al. |
| 2021/0334007 | A1 | 10/2021 | Liu et al. |
| 2021/0334137 | A1 | 10/2021 | Zhang et al. |
| 2021/0341989 | A1 | 11/2021 | Chen et al. |
| 2021/0374510 | A1 | 12/2021 | Liu et al. |
| 2021/0374511 | A1 | 12/2021 | Liu et al. |
| 2022/0129759 | A1* | 4/2022 | Yao ................. G06N 3/084 |
| 2022/0300800 | A1* | 9/2022 | Sikka ............... G06N 3/0985 |

FOREIGN PATENT DOCUMENTS

| | | |
|---|---|---|
| CN | 1851668 A | 10/2006 |
| CN | 101572829 A | 11/2009 |
| CN | 102270042 A | 12/2011 |
| CN | 102789413 A | 11/2012 |
| CN | 102903089 A | 1/2013 |

(56) References Cited

FOREIGN PATENT DOCUMENTS

| | | |
|---|---|---|
| CN | 104914977 A | 9/2015 |
| CN | 105389158 A | 3/2016 |
| CN | 107665364 A | 7/2016 |
| CN | 103534664 A | 8/2016 |
| CN | 105893419 A | 8/2016 |
| CN | 106156310 A | 11/2016 |
| CN | 106354568 A | 1/2017 |
| CN | 106406812 A | 2/2017 |
| CN | 106469291 A | 3/2017 |
| CN | 106650922 A | 5/2017 |
| CN | 106814639 A | 6/2017 |
| CN | 107197297 A | 6/2017 |
| CN | 106951587 A | 7/2017 |
| CN | 106951962 A | 7/2017 |
| CN | 106997236 A | 8/2017 |
| CN | 107003988 A | 8/2017 |
| CN | 107025629 A | 8/2017 |
| CN | 107368174 A | 11/2017 |
| CN | 107451654 A | 12/2017 |
| CN | 107644254 A | 1/2018 |
| CN | 107797913 A | 3/2018 |
| CN | 108337000 A | 7/2018 |
| CN | 108717570 A | 10/2018 |
| CN | 109062540 A | 12/2018 |
| CN | 109063820 A | 12/2018 |
| CN | 109146057 A | 1/2019 |
| CN | 109214509 A | 1/2019 |
| CN | 109389219 A | 2/2019 |
| CN | 109472353 A | 3/2019 |
| CN | 110008952 A | 3/2019 |
| CN | 109800877 A | 5/2019 |
| CN | 109902745 A | 6/2019 |
| CN | 110020616 A | 7/2019 |
| CN | 109993296 A | 9/2019 |
| EP | 0 789 296 A1 | 8/1997 |
| EP | 2 703 945 A2 | 3/2014 |
| EP | 3 106 997 A2 | 12/2016 |
| EP | 3 407 268 A1 | 11/2018 |
| IN | 104899641 A | 7/2018 |
| JP | H03075860 A | 8/1989 |
| JP | H09-265379 A | 10/1997 |
| JP | 2009134433 A | 8/2012 |
| JP | 2013514570 A | 4/2013 |
| JP | 2015509183 A | 3/2015 |
| JP | 1996087475 B2 | 5/2015 |
| JP | 2015176158 A | 10/2015 |
| JP | 2014199464 A | 10/2017 |
| JP | 201810618 A | 1/2018 |
| JP | 201826114 A | 2/2018 |
| JP | 2018514872 A | 6/2018 |
| JP | 2019519852 A | 7/2019 |
| KR | 20100087845 A | 1/2009 |
| KR | 10-2019-0034985 A | 4/2019 |
| WO | 2008153194 A1 | 12/2008 |
| WO | 2016186823 A1 | 11/2016 |
| WO | 2018/103736 A1 | 6/2018 |
| WO | 2018140294 A1 | 8/2018 |

OTHER PUBLICATIONS

Kalathingal Sajith et al., "Dynamic Inter-Thread Vectorization Architecture: Extracting OLP from TLP", 2016 28th International Symposium on Computer Architecture and High Performance Computing (SBAC- PAD), IEEE, Oct. 26, 2016, pp. 18-25, XP033028005, DOI: 10.1109/SBAC-PAD.2016.11.

Na et al., "Speeding up Convolutional Neural Network Training with Dynamic Precision Scaling and Flexible MultiplierAccumulator", Section 2 Proposed Approach: Concept, ACM, Aug. 8-10, 2016, 6 pages.

Hanlon, Jamie, "Why is so much memory needed for deep neural networks?", URL: https://www.graphcore.ai/posts/why-is-so-much-memory-needed-for-deep-neural-networks, Jan. 31, 2017, 6 pages.

Extended European Search Report for Application No. 19215861.6 mailed May 15, 2020.

Extended European Search Report for Application No. 19215862.4 mailed May 15, 2020.

Sumina Yamashita, et al., "A Method to create illustrate images using DCGAN," JISJ SIG Technical Report, vol. 2017-MPS-112 No. 16, Feb. 27, 2017; translation of abstract included.

Gysel Philipp et al., "Ristretto: A Framework for Empirical Study of Resource-Efficient Inference in Convolutional Neural Networks", IEEE Transactions on Neural Networks and Learning Systems, IEEE, Piscataway, NJ, USA, vol. 29, No. 11, Nov. 1, 2018 (Nov. 1, 2018), pp. 5784-5789, XP011692881, ISSN: 2162-237X, DOI: 10.1109/TNNLS.2018.2808319 [retrieved on Oct. 17, 2018].

Yi Yang et al., "Deploy Large-Scale Deep Neural Networks in Resource Constrained Io T Devices with Local Quantization Region", arxiv.org, Cornell University Library, 201 Olin Library Cornell University Ithaca, NY 14853, May 24, 2018 (May 24, 2018), XP081234517.

European Patent Office, Extended European Search Report for European Application No. 19218382.0 dated Apr. 24, 2020.

Olariu Cristian et al., "A Cloud-Based AI Framework for Machine Learning Orchestration: A "Driving or Not-Driving" Case-Study for Self-Driving Cars", 2019 IEEE Intelligent Vehicles Symposium (IV). IEEE, Jun. 9, 2019 (Jun. 9, 2019), pp. 1715-1722, XP033606002, DOI: 10.1109/IVS.2019.8813870 [retrieved on Aug. 26, 2019].

Kallam Suresh et al., "Evaluating the Performance of Deep Learning Techniques on Classification Using Tensor Flow Application", 2018 International Conference on Advances in Computing and Communication Engineering (ICACCE). IEEE, Jun. 22, 2018 (Jun. 22, 2018), pp. 331-335, XP033389370, DOI: 10.1109/ICACCE.2018.844167 4 [retrieved on Aug. 20, 2018].

Song Mingcong et al., "In-Situ AI: Towards Autonomous and Incremental Deep Learning for IoT Systems", 2018 IEEE International Symposium on High Performance Computer Architecture (HPCA), IEEE, Feb. 24, 2018 (Feb. 24, 2018), pp. 92-103, XP033341941, DOI: 10.1109/HPCA.2018.00018 [retrieved on Mar. 27, 2018].

Hsu Jeremy, "For sale: deep learning [News]", IEEE Spectrum, IEEE Inc. New York, US, vol. 53, No. 8, Aug. 1, 2016 (Aug. 1, 2016), pp. 12-13, XP011620787, ISSN: 0018-9235, DOI: 10.1109/MSPEC.2016.7524158 [retrieved on Jul. 27, 2016].

European Patent Office, extended European search report for Application No. 19216754.2 mailed May 8, 2020.

Extended European Search Report for EP Application No. 19214324.6 mailed Oct. 1, 2020.

* cited by examiner

NEURAL NETWORK QUANTIZATION DATA PROCESSING METHOD, DEVICE, COMPUTER EQUIPMENT AND STORAGE MEDIUM

RELATED APPLICATIONS

This application is a national stage application of PCT/CN2020/110321, filed Aug. 20, 2020, which claims the benefit of priority from Chinese Application No. 201910889202.9, filed Sep. 19, 2019, and Chinese Application No. 201910786019.6, filed Aug. 23, 2019, the disclosures of which are incorporated herein by reference in their entirety.

TECHNICAL FIELD

The present disclosure relates to the field of computer technologies, and in particular to a data processing method, a device, a computer equipment, and a storage medium.

BACKGROUND

A neural network (NN) is a mathematical model or computation model that imitates the structure and function of the biological neural network. Through the training with sample data, the neural network continuously corrects the network weights and thresholds so that the error function drops in the direction of negative gradient to approach the expected output. The neural network is a widely used recognition and classification model, a model mostly used for function approximation, model recognition and classification, data compression and time series prediction, etc. The neural network has been applied to image recognition, speech recognition, natural language processing and other fields. However, as the complexity of the neural network increases, the amount of data and data dimensions constantly increases, which poses great challenges to the data processing efficiency, storage capacity and access efficiency of operation devices. In related arts, quantization of operation data in the neural network is based on a fixed bit width, in other words, operation data of floating point type is converted to operation data of fixed point type to realize data compression in the neural network. However, in related arts, the same quantization scheme is adopted for the entire neural network. Since there may be great differences between different operation data in the neural network, adopting the same quantization scheme may lead to low precision and affect the result of data operation.

SUMMARY

Based on the situation above, in order to solve the technical problems, the present disclosure provides a data processing method, a device, a computer equipment, and a storage medium.

A first aspect of the present disclosure provides a neural network quantization method. For any layer to be quantized in a neural network, the method includes:

according to a storage capacity of a terminal running the neural network, determining a plurality of pieces of data to be quantized in target data of the layer to be quantized, where the target data is any batch of data to be operated in the layer to be quantized and the data to be operated includes at least one of input neurons and/or gradients;

using a loop processing method to quantize each piece of data to be quantized according to a corresponding quantization parameter to obtain a piece of quantized data corresponding to the piece of data to be quantized; and obtaining a quantization result of the target data according to the pieces of quantized data corresponding to the pieces of data to be quantized, so that an operation can be performed in the layer to be quantized according to the quantization result of the target data.

A second aspect of the present disclosure provides a neural network quantization device, for any layer to be quantized in the neural network, the neural network quantization device includes:

a data determination module configured to determine a plurality of pieces of data to be quantized in target data of the layer to be quantized according to a storage capacity of a terminal running the neural network, where the target data is any batch of data to be operated in the layer to be quantized and the data to be operated includes at least one of input neurons and/or gradients;

a data quantization module configured to use a loop processing method to quantize each piece of data to be quantized according to a corresponding quantization parameter to obtain a piece of quantized data corresponding to the piece of data to be quantized; and a result determination module configured to obtain a quantization result of the target data according to the pieces of quantized data corresponding to the pieces of data to be quantized, so that an operation may be performed in the layer to be quantized according to the quantization result of the target data.

A third aspect of the present disclosure provides an artificial intelligence chip including the above-mentioned neural network quantization device.

A fourth aspect of the present disclosure provides an electronic equipment including the above-mentioned artificial intelligence chip.

A fifth aspect of the present disclosure provides a board card including a storage component, an interface device, a control component, and the artificial intelligence chip.

The artificial intelligence chip is connected to the storage component, the control component, and the interface device, respectively.

The storage component is configured to store data.

The interface device is configured to implement data transfer between the artificial intelligence chip and an external equipment.

The control component is configured to monitor a state of the artificial intelligence chip.

A sixth aspect of the present disclosure provides a non-transitory computer readable storage medium that stores a computer program instruction. When the computer program instruction is executed by a processor, the neural network quantization method is realized.

The embodiments of the present disclosure provide a neural network quantization method, a device, a computer equipment, and a storage medium. The method includes: according to a storage capacity of a terminal running the neural network, determining a plurality of pieces of data to be quantized in target data of the layer to be quantized, where the target data is any batch of data to be operated in the layer to be quantized and the data to be operated includes at least one of input neurons and/or gradients; using a loop processing method to quantize each piece of data to be quantized according to a corresponding quantization parameter to obtain a piece of quantized data corresponding to the piece of data to be quantized; and obtaining a quantization result of the target data according to the pieces of quantized data corresponding to the pieces of data to be quantized, so that an operation can be performed in the layer to be quantized according to the quantization result of the target data. According to the neural network quantization method, the device, the computer equipment, and the storage medium provided in the embodiments of the present disclosure, a plurality of pieces of data to be quantized in the target data of the layer to be quantized can be determined according to the storage capacity of the terminal running the neural network, and each of the plurality of pieces of data to be quantized can be quantized according to the corresponding quantization parameter, which may thus reduce the storage space of data while ensuring the precision, ensure the accuracy and reliability of the operation result, and improve the operation efficiency. In addition, quantization also helps to reduce the size of the neural network model and relax the performance requirements of a terminal running the neural network model.

Through the derivation of the technical features in the claims, the technical effect of the technical problems in the background may be achieved. According to the following detailed description of exemplary embodiments with reference to the accompanying drawings, other features and aspects of the present disclosure will become clear.

BRIEF DESCRIPTION OF THE DRAWINGS

The drawings are included in the specification and constitute a part of the specification. Together with the specification, the drawings illustrate exemplary embodiments, features, and aspects of the present disclosure, and are used to explain the principles of the present disclosure.

DETAILED DESCRIPTION

Figure 1:
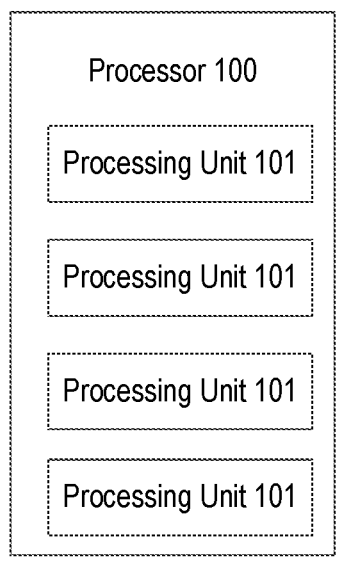
FIG. 1 shows a schematic diagram of a processor of a neural network quantization method according to an embodiment of the present disclosure.

Technical solutions in embodiments of the present disclosure will be described clearly and completely hereinafter with reference to the drawings in the embodiments of the present disclosure. Obviously, the embodiments to be described are merely some rather than all embodiments of the present disclosure. All other embodiments obtained by those of ordinary skill in the art based on the embodiments of the present disclosure without creative efforts shall fall within the protection scope of the present disclosure.

It should be understood that terms such as "first" and "second" in the claims, the specification, and the drawings are used for distinguishing different objects rather than describing a specific order. It should be understood that the terms "including" and "comprising" used in the specification and the claims indicate the presence of a feature, an entity, a step, an operation, an element, and/or a component, but do not exclude the existence or addition of one or more other features, entities, steps, operations, elements, components, and/or collections thereof.

It should also be understood that the terms used in the specification of the present disclosure are merely for the purpose of describing particular embodiments rather than limiting the present disclosure. As being used in the specification and the claims of the disclosure, unless the context clearly indicates otherwise, the singular forms "a", "an", and "the" are intended to include the plural forms. It should also be understood that the term "and/or" used in the specification and the claims refers to any and all possible combinations of one or more of relevant listed items and includes these combinations.

As being used in this specification and the claims, the term "if" can be interpreted as "when", or "once", or "in response to a determination" or "in response to a case where something is detected" depending on the context. Similarly, depending on the context, the phrase "if it is determined that" or "if [a described condition or event] is detected" can be interpreted as "once it is determined that", or "in response to a determination", or "once [a described condition or event] is detected", or "in response to a case where [a described condition or event] is detected".

As the complexity of neural network increases, the amount of data and data dimensions constantly increase too. However, since the traditional neural network algorithm often uses a floating point number format to perform a neural network operation, the increasing data volume poses great challenges to the data processing efficiency, storage capacity and access efficiency of the operation device. In order to solve the above-mentioned problems, in the related arts, all data involved in the neural network operation is converted from floating point numbers to fixed point numbers. However, since each piece of data may differ from one another, or a same piece of data may differ at different stage, the method that merely converts floating point numbers to fixed point numbers may lead to insufficient precision, thus affecting the operation result.

Data to be operated in the neural network is usually in the floating point number format or the fixed point number format with higher precision. When the neural network is run in a device carrying the neural network, the data to be operated in the floating point number format or the fixed point number format with higher precision leads to a large amount of operation and memory access overhead of the neural network operation. In order to improve the operation efficiency, according to the neural network quantization method, the device, the computer equipment, and the storage medium, the input neurons and/or gradients of each batch may be divided into a plurality of data to be quantized according to a count of batches for performing quantization. The format of the quantized data is usually the fixed point number format that has shorter bit width and lower precision. Using the quantized data with lower precision to perform the neural network operation may reduce the amount of operation and memory access. The quantized data is usually in the fixed point number format with shorter bit width. The data to be operated in the floating point number format may be quantized as the data to be operated in the fixed number format, and the data to be operated in the fixed point format with higher precision may be quantized as the data to be operated in the fixed point format with lower precision. Performing quantization on the data to be quantized by using the corresponding quantization parameter may reduce the storage space occupied by the stored data while ensuring the precision, ensure the accuracy and reliability of the operation result, and improve the efficiency of the operation. In addition, performing quantization also reduces the size of the neural network model and relaxes the performance requirements of the terminal running the neural network model, so that the neural network model may be applied to terminals such as mobile phones with relatively limited computing power, size, and power consumption.

It can be understood that the quantization precision refers to the size of an error between the quantized data and the data before quantization. The quantization precision may affect the accuracy of the operation result of the neural network. The higher the quantization precision is, the higher the accuracy of the operation result will be, but the amount of operation and the memory access overhead will also be larger. Compared with the quantized data with a shorter bit width, the quantized data with a longer bit width has a higher quantization precision, and the accuracy is also higher when the quantized data with a longer bit width is used to perform the neural network operation. However, when being used for the neural network operation, the quantized data with a longer bit width requires more operation, the memory access overhead is higher, and the operation efficiency is lower. In the same way, for the same data to be quantized, the quantization precision of the quantized data obtained by using different quantization parameters may be different, which may produce different quantization results, and will also have different effects on the operation efficiency and accuracy of the operation result. When the neural network is being quantized, in order to balance the operation efficiency and the accuracy of the operation result, the bit width of the quantized data and quantization parameters that are more in line with the data characteristics of the data to be operated may be used.

The data to be operated in the neural network includes at least one of the following: weights, neurons, biases, and gradients. The data to be operated is a matrix including a plurality of elements. In a traditional neural network quantization method, all data to be operated is usually operated after being quantized. When the quantized data to be operated is used for operation, only a part of all the quantized data to be operated is used for the operation. For example, in a convolution layer, when the overall quantized input neurons are used for a convolution operation, according to the dimension and step of the convolution kernel, quantized neurons with dimension equivalent to the convolution kernel are extracted from the overall quantized input neurons for the convolution operation. In a fully connected layer, when the overall quantized input neurons are used for a matrix multiplication operation, quantized neurons are extracted row by row from the overall quantized input neuron for the matrix multiplication operation. Therefore, in the traditional neural network quantization method, all the data to be operated is quantized and then operated according to part of the quantized data, which may lead to low operation efficiency In addition, in order to operate all the data to be operated after all the data to be operated is quantized, all the quantized data to be operated needs to be stored first, which occupies a large storage space. Besides, performing quantification on all the data to be operated requires that the terminal computing the neural network should have a better storage capacity, in this case, the usage requirements of terminals with lower performance cannot be met.

The neural network quantization method provided in the embodiments of the present disclosure may be applied to a processor. The processor may be a Central Processing Unit (CPU) or an artificial intelligence processor (IPU) for performing artificial intelligence operations. The artificial intelligence operations may include machine learning operations, brain-like operations, and the like. The machine learning operations may include neural network operations, k-means operations, support vector machine operations, and the like. The artificial intelligence processor may include one or more of, for example, a GPU (Graphics Processing Unit), an NPU (Neural-Network Processing Unit), a DSP (Digital Signal Process) unit, and an FPGA (Field-Programmable Gate Array) chip. The present disclosure does not limit the specific types of the processors.

In a possible implementation manner, the processors mentioned in the present disclosure may include a plurality of processing units, and each processing unit may independently execute various assigned tasks, such as convolution operation task, pooling task, or fully connected task, etc. The present disclosure does not limit the processing unit and the tasks executed by the processing unit.

FIG. 1 shows a schematic diagram of a processor of a neural network quantization method according to an embodiment of the present disclosure. As shown in FIG. 1, a processor 100 may include a plurality of processing units 101 and a storage unit 102. The plurality of processing units 101 are configured to execute an instruction sequence. The storage unit 102 is configured to store data, and may include a RAM (Random Access Memory) and a register file. The plurality of processing units 101 in the processor 100 may share part of the storage space. For example, the plurality of processing units 101 may share part of the RAM storage space and the register file, and may also have their own storage space at the same time.

Figure 2:
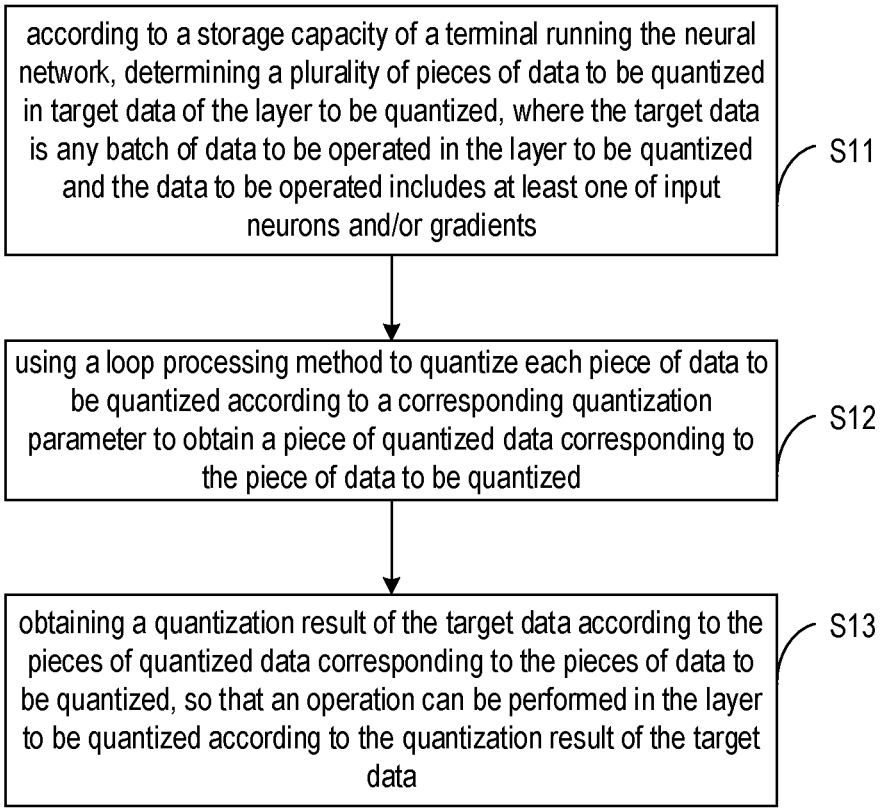
FIG. 2 shows a flowchart of a neural network quantization method according to an embodiment of the present disclosure.

FIG. 2 shows a flowchart of a neural network quantization method according to an embodiment of the present disclosure. As shown in FIG. 2, the neural network quantification method may be applied to any layer in the neural network. The method includes steps S11 to S13. The method may be applied to the processor 100 shown in FIG. 1. The processing unit 101 is configured to perform the steps S11 to S13. The storage unit 102 is configured to store data related to the processing procedure from the step S11 to the step S13, such as data to be quantized, quantization parameters, and data bit width.

The step S11 includes according to a storage capacity of a terminal running the neural network, determining a plurality of pieces of data to be quantized in target data of the layer to be quantized, where the target data is any batch of data to be operated in the layer to be quantized and the data to be operated includes at least one of input neurons and/or gradients.

The layer to be quantized in the neural network may be any layer of the neural network. Some or all of the layers in the neural network may be determined as the layers to be quantized according to the requirements. When the neural network includes a plurality of layers to be quantized, the layers to be quantized may be continuous or discontinuous. Different neural networks may have different types of layers to be quantized. For example, the layer to be quantized may be a convolution layer, a fully connected layer, etc. The present disclosure does not limit the count and type of layers to be quantized.

The data to be operated may also include weights and biases. At least one of the weights and the gradients in the layer to be quantized can be quantized according to the requirements. The quantization parameters may include one or more of point positions (including a first type of point position and a second type of point position described below), a scaling factor (including a first type of scaling factor and a second type of scaling factor described below), and offsets. The quantization method provided in the steps S11 to S13 is suitable for input neurons and gradients whose scaling factors include offsets and the second type of point positions and/or the second type of scaling factors. For the data to be operated whose quantization parameter includes other parameter combinations (for example, including the first type of point position and/or the first type of scaling factor) different from the parameter combination to which the steps S11 to S13 apply, other methods can be used for selecting the data to be quantized. The corresponding quantization parameter can be determined according to the data to be quantized and the corresponding data bit width, and quantization can be realized according to the corresponding quantization parameter. For example, the weights in the layer to be quantized may be used as the data to be quantized for quantization, or the biases in the layer to be quantized may be quantized. For determination of different quantization parameters, refer to the following description.

When there are various types of target data in the layers to be quantized, the quantization method provided in the present disclosure may be adopted to quantize the various types of target data to obtain the quantized data corresponding to the target data. The quantized data of various types of target data together with the data to be operated that does not need to be quantized are used for performing the operation in the layer to be quantized.

An inference stage of the neural network operation may include a stage in which a forward operation is performed on a trained neural network to complete a task. In the inference stage of the neural network, at least one of neurons, weights, biases, and gradients may be used as the data to be quantized and are quantized according to the quantization method provided in the embodiments of the present disclosure, and the quantized data is used to complete the operation in the layer to be quantized.

A fine-tuning stage of the neural network operation may include a stage in which forward operations and backward operations of a preset count of iterations are performed on a trained neural network to fine-tune the parameters, so that the neural network can be adapt to the task. In the fine-tuning stage of the neural network operation, at least one of neurons, weights, biases, and gradients may be quantized according to the quantization method provided in the embodiments of the present disclosure, and the quantized data is used to complete the forward operation and the backward operation in the layer to be quantized.

A training stage of the neural network operation may include a stage in which an iterative training is performed on an initialized neural network to obtain a trained neural network, where the trained neural network may execute specific tasks. In the training stage of the neural network, at least one of neurons, weights, biases, and gradients may be quantized according to the quantization method provided in the embodiments of the present disclosure, and the quantized data is used to complete the forward operation and the backward operation of the layer to be quantized.

The target data may be also divided into a plurality of pieces of data to be quantized according to a preset data division method. For example, the preset data division method may be dividing data according to a fixed data size or dividing data according to a fixed data shape (dimension, length, bit width, etc.).

After the target data is divided into a plurality of pieces of data to be quantized, each piece of data to be quantized may be quantized separately, and an operation may be performed based on the data obtained after quantizing the pieces of data to be quantized. The quantization time required for a piece of data to be quantized is shorter than the overall quantization time of the target data. After a piece of data to be quantized is quantized, the piece of quantized data may be used for performing a subsequent operation, instead of performing operations after all the pieces of data to be quantized in the target data are quantized. Therefore, the target data quantization method in the present disclosure improves the operation efficiency of target data.

The step S12 includes using a loop processing method to quantize each piece of data to be quantized according to a corresponding quantization parameter to obtain a piece of quantized data corresponding to the piece of data to be quantized.

The loop processing method may be used for quantizing the same batch of data to be operated for a plurality of times to complete the quantization of the batch of data to be operated.

In a possible implementation manner, the step S12 may include:
  after a previous loop processing process ends, starting a current loop processing process, and determining a piece of data to be quantized after a piece of data to be quantized that is quantized in the previous loop processing process as a current piece of data to be quantized that is to be quantized in the current loop processing process;
  comparing a statistical result of the current piece of data to be quantized with a stored reference statistical result to obtain a comparison result;
  when the comparison result meets a quantization parameter operation condition, determining an updated statistical result according to the statistical result of the current piece of data to be quantized and the reference statistical result;
  determining a quantization parameter corresponding to the current piece of data to be quantized according to the updated statistical result and a corresponding data bit width; and
  quantizing the current piece of data to be quantized according to the corresponding quantization parameter to obtain a piece of quantized data corresponding to the current piece of data to be quantized, and finishing the current loop processing process.

In a possible implementation manner, the step S12 may further include storing the updated statistical result and the quantization parameter corresponding to the updated statistical result as a new reference statistical result and a new reference quantization parameter, respectively.

In a possible implementation, the step S12 may further include when the comparison result does not meet the quantization parameter operation condition, determining a reference quantization parameter corresponding to the reference statistical result as the quantization parameter of the current piece of data to be quantized.

In a possible implementation manner, the statistical result of the current piece of data to be quantized includes a maximum value and a minimum value in the current piece of data to be quantized, and the reference statistical result includes a reference maximum value and a reference minimum value.

The step of when the comparison result meets the quantization parameter operation condition, determining an updated statistical result according to the statistical result of the current piece of data to be quantized and the reference statistical result may include any of the following methods:

when the maximum value in the current piece of data to be quantized is greater than the reference maximum value, and the minimum value in the current piece of data to be quantized is less than the reference minimum value, determining the statistical result of the current piece of data to be quantized as the updated statistical result;

when the maximum value in the current piece of data to be quantized is less than or equal to the reference maximum value, and the minimum value in the current piece of data to be quantized is less than the reference minimum value, determining the reference maximum value and the minimum value in the current piece of data to be quantized as the updated statistical result; and when the maximum value in the current piece of data to be quantized is greater than the reference maximum value, and the minimum value in the current piece of data to be quantized is less than the reference minimum value, determining the maximum value in the current piece of data to be quantized and the reference minimum value as the updated statistical result.

In this implementation manner, when a plurality of pieces of data in a certain batch of data to be operated are to be quantized, a statistical result of a first piece of data to be quantized and a corresponding quantization parameter may be determined as a reference statistical result and a reference quantization parameter, respectively.

The step S13 includes obtaining a quantization result of the target data according to the pieces of quantized data corresponding to the pieces of data to be quantized, so that an operation can be performed in the layer to be quantized according to the quantization result of the target data.

A preset quantization algorithm may be used to quantize data to be quantized according to a quantization parameter to obtain quantized data. For example, a rounding algorithm may be used as the quantization algorithm to perform rounding quantization on the data to be quantized according to the data bit width and the position of the decimal point to obtain the quantized data. The rounding algorithm may include rounding up, rounding down, rounding to zero, and rounding off. The present disclosure does not limit the specific implementation manner of the quantization algorithm.

Each piece of data to be quantized may be quantized according to the corresponding quantization parameter. Since the quantization parameter corresponding to each piece of data to be quantized is more compatible with the features of the piece of data to be quantized, the quantization precision of each kind of data to be quantized in each layer to be quantized is more in accordance with the operation requirements of the target data, and is thus more in accordance with the operation requirements of the layer to be quantized. On the premise of ensuring the accuracy of the operation result of the layer to be quantized, the method may improve the operation efficiency of the layer to be quantized, and may achieve a balance between the operation efficiency of the layer to be quantized and the accuracy of the operation result. Furthermore, the target data may be divided into a plurality of pieces of data, so that each piece of data to be quantized may be quantized separately. After a first piece of data to be quantized is quantized, an operation may be performed according to the quantization result, and at the same time, a second piece of data to be quantized may be quantized. In this way, the overall operation efficiency of the target data may be improved, and the operation efficiency of the layer to be quantized may be improved too.

All pieces of quantized data of the pieces of data to be quantized may be combined to obtain the quantization result of the target data, or a preset operation may be performed on all pieces of quantized data of the pieces of data to be quantized to obtain the quantization result of the target data. For example, the pieces of quantized data of the pieces of data to be quantized may be weighted according to a preset weight to obtain the quantization result of the target data, which is not limited in the present disclosure.

In the process of inference, training and fine-tuning of the neural network, the data to be quantized may be quantized offline or online. The offline quantization refers to performing offline processing on data to be quantized by using the quantization parameter. The online quantization refers to performing online processing on the data to be quantized by using the quantization parameter. For example, when the neural network is running on an artificial intelligence chip, the data to be quantized and the quantization parameter may be sent to an operation device outside the artificial intelligence chip for offline quantization, or an operation device outside the artificial intelligence chip may be used to perform offline quantization on the pre-obtained data to be quantized and the quantization parameter. In the process of running the neural network by the artificial intelligence chip, the artificial intelligence chip may use the quantization parameter to perform online quantization on the data to be quantized. The present disclosure does not limit whether the data to be quantized is quantized online or offline.

For any layer to be quantized in the neural network, the neural network quantization method provided by the embodiments of the present disclosure includes: according to the storage capacity of the terminal running the neural network, determining a plurality of pieces of data to be quantized in the target data of the layer to be quantized, where the target data is any batch of data to be operated in the layer to be quantized and the data to be operated includes at least one of input neurons and/or gradients; using the loop processing method to quantize each piece of data to be quantized according to the corresponding quantization parameter to obtain a piece of quantized data corresponding to the piece of data to be quantized; and obtaining the quantization result of the target data according to the pieces of quantized data corresponding to the pieces of data to be quantized, so that an operation may be performed in the layer to be quantized according to the quantization result of the target data. After the same batch of data to be operated is divided into a plurality of pieces of data to be quantized, the plurality of pieces of data to be quantized are sequentially quantized according to the loop processing method, which may improve the quantization efficiency and operation efficiency of the target data, and may also improve the quantization efficiency and the operation efficiency of the layer to be quantized and even the entire neural network.

In a possible implementation manner, for the data to be quantized except the data to which the steps S11 to S13 apply, how to determine the quantization parameter corresponding to the data to be quantized may include the following three manners.

Manner 1: after determining a quantization parameter corresponding to the target data, determining the quantization parameter corresponding to the target data as the quantization parameter of the data to be quantized. When the layer to be quantized includes a plurality of pieces of target data, each piece of target data may have a corresponding quantization parameter. The quantization parameters corresponding to the plurality of pieces of target data may be different or the same, which is not limited in the present disclosure. After the target data is divided into a plurality of pieces of data to be quantized, the quantization parameter corresponding to the target data may be determined as the quantization parameter corresponding to each piece of data to be quantized. At this time, the quantization parameters corresponding to the different pieces of data to be quantized are the same, then the plurality of pieces of data to be quantized are quantized sequentially.

Manner 2: directly determining the quantization parameter corresponding to each piece of data to be quantized. The target data may not have a corresponding quantization parameter, or the target data may have a corresponding quantization parameter but the data to be quantized does not adopt the quantization parameter of the target data. The quantization parameter may be directly set for each piece of data to be quantized, or the quantization parameter may be obtained by computing according to a piece of data to be quantized. At this time, the quantization parameters corresponding to the different pieces of data to be quantized may be the same or different. For example, when the layer to be quantized is a convolution layer and the weights serve as the target data, the weights may be divided into a plurality of pieces of weight data to be quantized according to channels, and the pieces of weight data to be quantized of different channels may correspond to different quantization parameters. When the quantization parameters corresponding to the different pieces of data to be quantized are different, after each piece of data to be quantized is quantized according to the corresponding quantization parameter, the quantization result obtained should not affect the operation of the target data.

Manner 3: directly determining the quantization parameter by looking up a preset quantization parameter, determining the quantization parameter by looking up a correspondence, or determining the quantization parameter by computing according to the data to be quantized. The manner of determining the quantization parameter corresponding to the data to be quantized is taken as an example for description below.

The quantization parameter corresponding to the data to be quantized may be set directly. The preset quantization parameter may be stored in a preset storage space. The preset storage space may be an on-chip or an off-chip storage space. For example, the preset quantization parameter may be stored in the preset storage space. When each piece of data to be quantized is being quantized, the corresponding quantization parameter may be fetched from the preset storage space for quantization. The quantization parameter corresponding to each kind of data to be quantized may be set according to an empirical value, or the stored quantization parameter corresponding to each kind of data to be quantized may be updated according to requirements.

The quantization parameter may be determined by looking up the correspondence between the data characteristics and the quantization parameter according to the data characteristics of the respective pieces of data to be quantized. For example, the data to be quantized may have a different quantization parameter when the data to be quantized is sparsely distributed or densely distributed. The quantization parameter corresponding to the data distribution of the data to be quantized may be determined by looking up the correspondence.

In addition, by adopting the preset quantization parameter computation method, the quantization parameter corresponding to each layer to be quantized may be obtained according to the respective pieces of data to be quantized. For example, the position of a point in the quantization parameter may be computed by using a rounding algorithm according to the maximum of the absolute values of the data to be quantized and the preset data bit width.

In a possible implementation manner, the method may further include computing the corresponding quantization parameter according to each piece of data to be quantized and the corresponding data bit width.

In the implementation manner, statistical analysis may be performed on the data to be quantized, and the quantization parameter corresponding to the data to be quantized may be determined according to the statistical result and the data bit width. The quantization parameter may include one or more of the point position, the scaling factor, and an offset. (For a definition of offset, please see FIG. 4 and its description below.)

In a possible implementation manner, the step of computing the corresponding quantization parameter according to each piece of data to be quantized and the corresponding data bit width may include:

when the quantization parameter does not include the offset, obtaining a first type of point position of each piece of data to be quantized according to $Z_1$ (the maximum of the absolute value of each piece of data to be quantized) and the corresponding data bit width, where $Z_1$, the maximum of the absolute value, is the maximum obtained by taking the absolute value of the data to be quantized.

In the implementation manner, when the data to be quantized is symmetric data with respect to the origin, the quantization parameter may not include the offset. It is assumed that $Z_1$ is the maximum of the absolute value of the elements of the data to be quantized, the data bit width corresponding to the data to be quantized is n, and $A_1$ is the maximum that can be represented by the quantized data after the data to be quantized is quantized according to the data bit width n, $A_1$ is $2^{s_1}(2^{n-1}-1)$, $A_1$ needs to include Z1, and Z1 must be greater than $$\frac{A_1}{2},$$

therefore, there is a constraint of formula (1):

$$2^{s_1}(2^{n-1}-1) \geq Z_1 > 2^{s_1-1}(2^{n-1}-1) \qquad \text{formula (1)}$$

The processor may compute a first type of point position $s_1$ according to the maximum of the absolute value $Z_1$ and the data bit width n of the data to be quantized. For example, the following formula (2) may be used to compute the first type of point position $s_1$ corresponding to the data to be quantized:

$$s_1 = \text{ceil}\left(\log_2\left(\frac{Z_1}{2^{n-1}-1}\right)\right) \qquad \text{formula (2)}$$

where ceil denotes a rounding up operation, $Z_1$ denotes the maximum of the absolute value of the data to be quantized, $s_1$ denotes the first type of point position, and n denotes the data bit width.

In a possible implementation manner, the step of computing the corresponding quantization parameter according to each piece of data to be quantized and the corresponding data bit width may include:

when the quantization parameter includes the offset, obtaining a second type of point position $s_2$ of each piece of data to be quantized according to the maximum and the minimum of each piece of data to be quantized and the corresponding data bit width. Alternatively, when the quantization parameter includes the offset, obtaining a second type of point position $s_2$ of the current piece of data to be quantized according to the maximum and the minimum of the updated statistical result and the corresponding data bit width.

In the implementation manner, the maximum $Z_{max}$ and minimum $Z_{min}$ of the data to be quantized (or the updated statistical result) may be obtained first, and then the following formula (3) is used to perform an operation according to the maximum $Z_{max}$ and minimum $Z_{min}$, $$z_2 = \frac{Z_{max} - Z_{min}}{2} \quad \text{formula (3)}$$

Further, according to $Z_2$ obtained from computation and the corresponding data bit width, the second type of point position $s_2$ is obtained by using the following formula (4):

$$s_2 = \text{ceil}\left(\log_2\left(\frac{z_2}{2^{n-1}-1}\right)\right) \quad \text{formula (4)}$$

In this implementation manner, normally the maximum and minimum of the data to be quantized are stored during quantization, so that the maximum of the absolute value can be obtained directly based on the stored maximum and minimum of the data to be quantized. In this case, there is no need to spend extra resources to find the absolute value of the data to be quantized, which may reduce the time spent on determining the statistical result.

In a possible implementation manner, the step of computing the corresponding quantization parameter according to each piece of data to be quantized and the corresponding data bit width may include:

when the quantization parameter does not include the offset, obtaining the maximum of the piece of quantized data according to each piece of data to be quantized and the corresponding data bit width; and obtaining a first type of scaling factor f' of each piece of data to be quantized according to the maximum of the absolute value of each piece of data to be quantized and the maximum of the piece of quantized data, where the first type of scaling factor f' may include a first scaling factor $f_1$ and a second scaling factor $f_2$.

The first scaling factor $f_1$ may be computed according to the following formula (5):

$$f_1 = \frac{z_1}{A_1} = \frac{z_1}{2^{s_1}(2^{n-1}-1)} \quad \text{formula (5)}$$

The second scaling factor $f_2$ may be computed according to the following formula (6):

$$f_2 = 2^{s_1} \times f_1 \quad \text{formula (6)}$$

In a possible implementation manner, the step of computing the corresponding quantization parameter according to each piece of data to be quantized and the corresponding data bit width may include:

obtaining the offset of each piece of data to be quantized according to the maximum and the minimum in each piece of data to be quantized; or obtaining the offset of the current piece of data to be quantized according to the maximum and the minimum in the updated statistical result.

Figure 3:
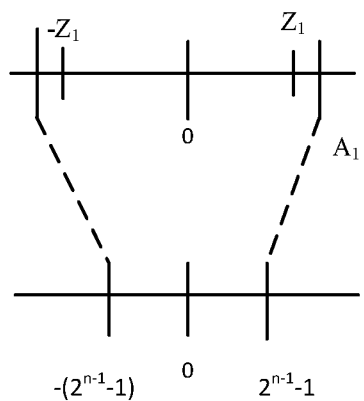
FIG. 3 shows a schematic diagram of a symmetric fixed point number representation according to an embodiment of the present disclosure.
Figure 4:
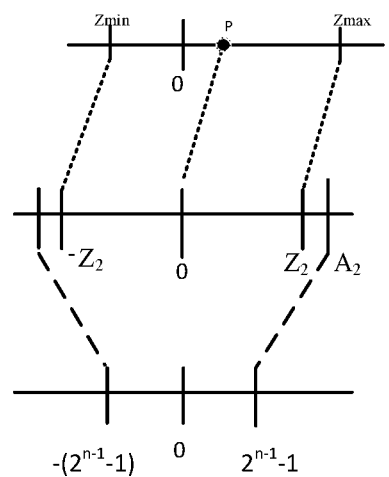
FIG. 4 shows a schematic diagram of a fixed-point number representation after an offset is introduced according to an embodiment of the present disclosure.

In the implementation manner, FIG. 3 shows a schematic diagram of a symmetric fixed point number representation according to an embodiment of the present disclosure. As shown in FIG. 3, the number field of the data to be quantized is distributed with "0" as the symmetric center. $Z_1$ is the maximum of the absolute value of all floating point numbers in the number field of the data to be quantized. In FIG. 3, $A_1$ denotes the maximum of a floating point number that can be represented by an n-bit fixed point number; and after being converted to a fixed point number, the floating point number $A_1$ becomes $(2^{n-1}-1)$. In order to avoid an overflow, $A_1$ needs to include $Z_1$. In a practical operation, the floating point data of a neural network operation tends to be normally distributed in a certain interval, but the floating point data is not necessarily distributed with "0" as the symmetric center, in this case, when the floating point data are represented by fixed point numbers, an overflow is likely to occur. In order to improve this situation, an offset is introduced in the quantization parameter. FIG. 4 shows a schematic diagram of a fixed point number representation after an offset is introduced according to an embodiment of the present disclosure. As shown in FIG. 4, the number field of the data to be quantized is not distributed with "0" as the symmetric center, $Z_{min}$ is the minimum among all floating point numbers in the number field of the data to be quantized, $Z_{max}$ is the maximum among all floating point numbers in the number field of the data to be quantized, $A_2$ is the maximum among the translated floating point numbers represented by an n-bit fixed point number, $A_2$ is $2^{s_2}(2^{n-1}-1)$, and P is the center point between $Z_{min}$–$Z_{max}$. In order to avoid data overflows, the number field of the data to be quantized is translated globally, so that the number field of the translated data to be quantized is distributed with "0" as the symmetric center. The maximum of the absolute value in the number field of the translated data to be quantized is $Z_2$. As shown in FIG. 4, the offset is the horizontal distance between the "0" point and the "P" point. This distance is called offset o.

According to the minimum $Z_{min}$ and the maximum $Z_{max}$, the offset can be computed by using the following formula (7):

$$o = \frac{Z_{max} + Z_{min}}{2} \quad \text{formula (7)}$$

where o represents the offset, $Z_{min}$ denotes the minimum among all the elements of the data to be quantized (or in the updated statistical result), and $Z_{max}$ represents the maximum among all the elements of the data to be quantized (or in the updated statistical result).

In a possible implementation manner, the step of computing the corresponding quantization parameter according to each piece of data to be quantized and the corresponding data bit width may include:

when the quantization parameter includes the offset, obtaining the maximum of the piece of quantized data according to each piece of data to be quantized and the corresponding data bit width; and obtaining a second type of scaling factor f" of each piece of data to be quantized according to the maximum and the minimum of each piece of data to be quantized as well as the maximum of the piece of quantized data. The second type of scaling factor f" may include a third scaling factor $f_3$ and a fourth scaling factor $f_4$. Alternatively, the second type of scaling factor of the current piece of data to be quantized may be obtained according to the maximum and the minimum in the updated statistical result as well as the maximum of the piece of quantized data.

In the implementation manner, when the quantization parameter includes the offset, $A_2$ denotes the maximum that can be represented by the quantized data after the translated data to be quantized is quantized according to the data bit width n, $A_2$ is $2^{s_2}(2^{n-1}-1)$. The maximum of the absolute value $Z_2$ in the number field of the translated data to be quantized may be computed according to the maximum $Z_{max}$ and the minimum $Z_{min}$ of the data to be quantized (or of the updated statistical result), and then the third scaling factor $f_3$ may be computed according to the following formula (8):

$$f_3 = \frac{z_2}{A_2} = \frac{z_2}{2^{s_2}(2^{n-1}-1)} \qquad \text{formula (8)}$$

Further, the fourth scaling factor $f_4$ may be computed according to the following formula (9):

$$f_4 = \frac{z_2}{(2^{n-1}-1)} \qquad \text{formula (9)}$$

When the data to be quantized is being quantized, the data used for quantization may differ due to different quantization parameters adopted.

In a possible implementation manner, the quantization parameter may include the first type of point position $s_1$. The following formula (10) may be used to quantize the data to be quantized to obtain the quantized data $I_x$:

$$I_x = \text{round}\left(\frac{F_x}{2^{s_1}}\right) \qquad \text{formula (10)}$$

where $I_x$ denotes the quantized data, $F_x$ denotes the data to be quantized, round denotes a rounding off operation.

When the quantization parameter includes the first type of point position $s_1$, the quantized data of the target data may be de-quantized according to formula (11) to obtain the de-quantized data of the target data $\widehat{F_x}$:

$$\widehat{F_x} = \text{round}\left(\frac{F_x}{2^{s_1}}\right) \times 2^{s_1} \qquad \text{formula (11)}$$

In a possible implementation manner, the quantization parameter may include the first type of point position and the first scaling factor. The following formula (12) may be used to quantize the data to be quantized to obtain the quantized data $I_x$:

$$I_x = \text{round}\left(\frac{F_x}{2^{s_1} \times f_1}\right) \qquad \text{formula (12)}$$

When the quantization parameter includes the first type of point position and the first scaling factor, the quantized data of the target data may be de-quantized according to formula (13) to obtain the de-quantized data of the target data $\widehat{F_x}$:

$$\widehat{F_x} = \text{round}\left(\frac{F_x}{2^{s_1} \times f_1}\right) \times 2^{s_1} \times f_1 \qquad \text{formula (13)}$$

In a possible implementation manner, the quantization parameter may include the second scaling factor. The following formula (14) may be used to quantize the data to be quantized to obtain the quantized data $I_x$:

$$I_x = \text{round}\left(\frac{F_x}{f_2}\right) \qquad \text{formula (14)}$$

When the quantization parameter includes the second scaling factor, the quantized data of the target data may be de-quantized according to formula (15) to obtain the de-quantized data of the target data $\widehat{F_x}$:

$$\widehat{F_x} = \text{round}\left(\frac{F_x}{f_2}\right) \times f_2 \qquad \text{formula (15)}$$

In a possible implementation manner, the quantization parameter may include the offset. The following formula (16) may be used to quantize the data to be quantized to obtain the quantized data $I_x$:

$$I_x = \text{round}(F_x - o) \qquad \text{formula (16)}$$

When the quantization parameter includes the offset, the quantized data of the target data may be de-quantized according to formula (17) to obtain the de-quantized data of the target data $\widehat{F_x}$:

$$\widehat{F_x} = \text{round}(F_x - o) + o \qquad \text{formula (17)}$$

In a possible implementation manner, the quantization parameter may include the second type of point position and the offset. The following formula (18) may be used to quantize the data to be quantized to obtain the quantized data $I_x$:

$$I_x = \text{round}\left(\frac{F_x - 0}{2^{s_2}}\right) \qquad \text{formula (18)}$$

When the quantization parameter includes the second type of point position and the offset, the quantized data of the target data may be de-quantized according to formula (19) to obtain the de-quantized data of the target data $\widehat{F_x}$:

$$\widehat{F_x} = \text{round}\left(\frac{F_x - 0}{2^{s_2}}\right) \times 2^{s_2} + 0 \qquad \text{formula (19)}$$

In a possible implementation manner, the quantization parameter may include the second type of scaling factor f"

and the offset o. The following formula (20) may be used to quantize the data to be quantized to obtain the quantized data $I_x$:

$$F_x = \text{round}\left(\frac{F_x - 0}{f''}\right) \quad \text{formula (20)}$$

When the quantization parameter includes the second type of scaling factor and the offset, the quantized data of the target data may be de-quantized according to formula (21) to obtain the de-quantized data of the target data $\widehat{F_x}$:

$$\widehat{F_x} = \text{round}\left(\frac{F_x - 0}{f''}\right) \times f + 0 \quad \text{formula (21)}$$

In a possible implementation manner, the quantization parameter may include the second type of point position, the second type of scaling factor, and the offset. The following formula (22) may be used to quantize the data to be quantized to obtain the quantized data $I_x$:

$$I_x = \text{round}\left(\frac{f_x - 0}{2^{s2} \times f''}\right) \quad \text{formula (22)}$$

When the quantization parameter includes the second type of point position, the second type of scaling factor, and the offset, the quantized data of the target data may be de-quantized according to formula (23) to obtain the de-quantized data of the target data $\widehat{F_x}$:

$$\widehat{F_x} = \text{round}\left(\frac{F_x - 0}{2^{s2} \times f''}\right) \times 2^{s2} \times f + 0 \quad \text{formula (23)}$$

It should be understood that other rounding operation methods such as rounding up, rounding down, and rounding to zero may be also used to replace the rounding off operation round in the formulas above. It can be understood that, in the case of a certain data bit width, for the quantized data obtained according to the point position, the more the decimal places are, the greater the quantization precision of the data to be quantized will be.

In a possible implementation manner, the step S11 may include:

determining the quantization parameter corresponding to each type of data to be quantized in the layer to be quantized by looking up the correspondence between the data to be quantized and the quantization parameter.

In a possible implementation manner, the quantization parameter corresponding to each type of data to be quantized in each layer to be quantized may be a stored preset value. A correspondence between the data to be quantized and the quantization parameter may be established for the neural network. The correspondence may include the correspondence between each type of data to be quantized in each layer to be quantized and the quantization parameter, and the correspondence may be stored in a storage space that each layer may share and access. It is also possible to establish correspondences between a plurality of pieces of data to be quantized and the quantization parameters for the neural network, and each layer to be quantized corresponds to one of the correspondences. The correspondence of each layer may be stored in a storage space exclusive to this layer, or the correspondence of each layer may be stored in a storage space that each layer may share and access.

The correspondence between the data to be quantized and the quantization parameter may include correspondences between a plurality of pieces of data to be quantized and a plurality of corresponding quantization parameters. For example, the correspondence A between the data to be quantized and the quantization parameter may include: two pieces of data to be quantized including neurons and weights in a layer 1 to be quantized; three quantization parameters including a point position 1 corresponding to the neurons, a scaling factor 1, and an offset 1; and two quantization parameters including a point position 2 corresponding to the weights and an offset 2. The present disclosure does not limit the specific format of the correspondence between the data to be quantized and the quantization parameter.

In the implementation manner, the quantization parameter corresponding to each type of data to be quantized in the layer to be quantized may be determined by looking up the correspondence between the data to be quantized and the quantization parameter. The corresponding quantization parameter may be preset for each layer to be quantized, and stored based on the correspondence for use by the layer to be quantized after looking up the parameter. The method of obtaining the quantization parameter provided in the embodiment is simple and convenient.

Figure 5:
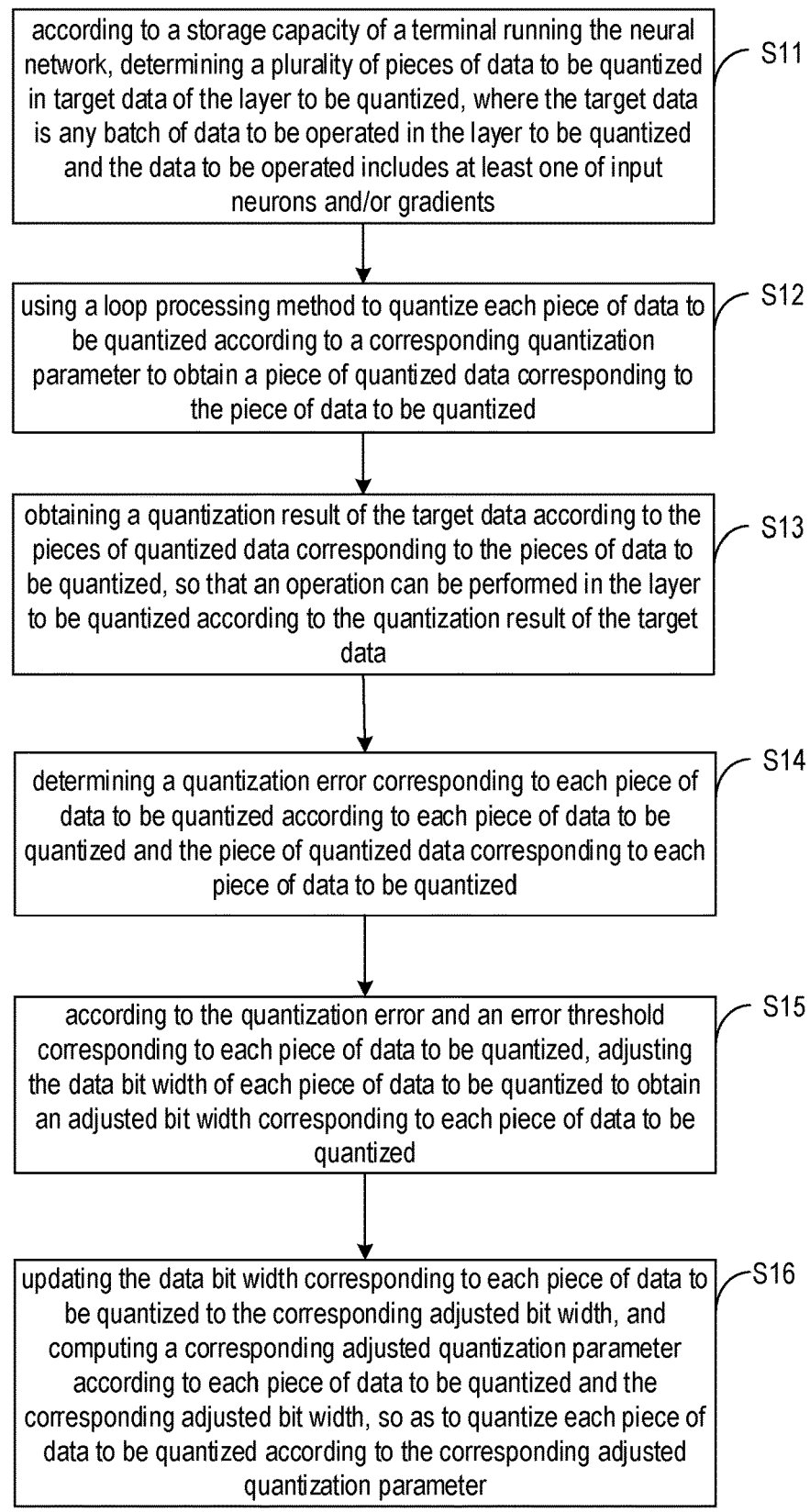
FIG. 5 shows a flowchart of a neural network quantization method according to an embodiment of the present disclosure.

FIG. 5 shows a flowchart of a neural network quantization method according to an embodiment of the present disclosure. In a possible implementation manner, as shown in FIG. 5, the method may further include steps S14-S16.

The step S14 includes determining a quantization error corresponding to each piece of data to be quantized according to each piece of data to be quantized and the piece of quantized data corresponding to each piece of data to be quantized.

The quantization error of the data to be quantized may be determined according to an error between the quantized data corresponding to the data to be quantized and the data to be quantized. The quantization error of the data to be quantized may be computed by using a preset error computation method such as a standard deviation computation method and a root-mean-square error computation method.

The quantization error of the data to be quantized may also be determined using the approach below: according to the quantization parameter, de-quantizing the quantized data corresponding to the data to be quantized to obtain the de-quantized data, and then, using the formula (24) to determine the quantization error of the data to be quantized $\text{diff}_{bit}$ according to the error between the de-quantized data and the data to be quantized.

$$\text{diff}_{bit} = \log_2\left(\frac{\sum_i |\widehat{F}_i| - \sum_i |F_i|}{\sum_i |F_i|} + 1\right) \quad (24)$$

$F_i$ denotes the floating point value corresponding to the data to be quantized. i denotes the subscript of the data to be quantized, $\widehat{F}_i$ and denotes the de-quantized data corresponding to the floating point value.

The quantization error $\text{diff}_{bit}$ may also be determined by using the formula (25) according to a quantization interval, a count of quantized data, and the corresponding data to be quantized.

$$diff_{bit} = \log_2\left(\frac{C*2^{-1}*m}{\sum_i |F_i|}\right) \quad (25)$$

C denotes the quantization interval, m denotes the count of quantized data obtained after quantization, $F_i$ denotes the floating point value corresponding to the data to be quantized, where i denotes the subscript of the data to be quantized.

The quantization error $diff_{bit}$ may also be determined by using the formula (26) according to the quantized data and the corresponding de-quantized data.

$$diff_{bit} = \log_2\left(\frac{\sum_i |\hat{F}_i - F_i|}{\sum_i |F_i|} + 1\right) \quad (26)$$

$F_i$ denotes the floating point value corresponding to the data to be quantized, where i denotes the subscript of the data to be quantized, $\hat{F}_i$ and denotes the de-quantized data corresponding to the floating point value.

The step S15 includes according to the quantization error and an error threshold corresponding to each piece of data to be quantized, adjusting the data bit width of each piece of data to be quantized to obtain an adjusted bit width corresponding to each piece of data to be quantized.

The error threshold may be determined according to the empirical value, and the error threshold may be used to indicate an expected value of the quantization error. When the quantization error is greater than or less than the error threshold, the data bit width corresponding to the data to be quantized may be adjusted to obtain the adjusted bit width corresponding to the data to be quantized. The data bit width may be adjusted to a longer bit width or a shorter bit width to increase or decrease the quantization precision.

The error threshold may be determined according to the maximum acceptable error. When the quantization error is greater than the error threshold, it means that the quantization precision cannot meet the expectation, and the data bit width needs to be adjusted to a longer bit width. A smaller error threshold may be determined based on a higher quantization precision. When the quantization error is less than the error threshold, it means that the quantization precision is relatively higher, which may affect the operation efficiency of the neural network. In this case, the data bit width may be adjusted to a shorter bit width to appropriately decrease the quantization precision and improve the operation efficiency of the neural network.

The data bit width may be adjusted according to a stride with fixed bits, or the data bit width may be adjusted according to a variable adjustment stride according to the difference between the quantization error and the error threshold, which is not limited in the present disclosure.

The step S16 includes updating the data bit width corresponding to each piece of data to be quantized to the corresponding adjusted bit width, and computing a corresponding adjusted quantization parameter according to each piece of data to be quantized and the corresponding adjusted bit width, so as to quantize each piece of data to be quantized according to the corresponding adjusted quantization parameter.

After the adjusted bit width is determined, the data bit width corresponding to the data to be quantized may be updated to the adjusted bit width. For example, when the data bit width of the data to be quantized before updating is 8 bits, and the adjusted bit width is 12 bits, then the data bit width corresponding to the data to be quantized after updating is 12 bits. The adjusted quantization parameter corresponding to the data to be quantized may be obtained by computing according to the adjusted bit width and the data to be quantized. The data to be quantized may be re-quantized according to the adjusted quantization parameter corresponding to the data to be quantized to obtain the quantized data with higher or lower quantization precision, so that a balance between the quantization precision and the processing efficiency may be achieved in the layer to be quantized.

In the process of inference, training and fine-tuning of the neural network, the data to be quantized between each layer may be considered to have a certain correlation. For example, when the difference between the means of the data to be quantized of the respective layers is less than a preset mean threshold, and the difference between the maximum values of the data to be quantized in the respective layers is also less than a preset difference threshold, the adjusted quantization parameter of a layer to be quantized may be used as the adjusted quantization parameter of one or more subsequent layers for quantizing the data to be quantized in the one or more subsequent layers after the layer to be quantized. In the training and fine-tuning process of the neural network, the adjusted quantization parameter in the layer to be quantized obtained during a current iteration may also be used to quantize the layer to be quantized in subsequent iterations.

In a possible implementation manner, the method further includes using the quantization parameter of the layer to be quantized in one or more layers after the layer to be quantized.

The quantization of the neural network according to the adjusted quantization parameter may include re-quantizing the data to be quantized by using the adjusted quantization parameter only in the layer to be quantized, and using the re-obtained quantized data for the operation of the layer to be quantized.

The quantization of the neural network according to the adjusted quantization parameter may also include: instead of re-quantizing the data to be quantized by using the adjusted quantization parameter in the layer to be quantized, quantizing the data to be quantized by using the adjusted quantization parameter in one or more subsequent layers after the layer to be quantized, and/or quantizing the data to be quantized by using the adjusted quantization parameter in the layer to be quantized during the subsequent iterations.

The quantization of the neural network according to the adjusted quantization parameter may also include: re-quantizing the data to be quantized by using the adjusted quantization parameter in the layer to be quantized, and using the re-obtained quantized data for the operation of the layer to be quantized, quantizing the data to be quantized by using the adjusted quantization parameter in one or more subsequent layers after the layer to be quantized, and/or quantizing the data to be quantized by using the adjusted quantization parameter in the layer to be quantized during the subsequent iterations. The above is not limited in the present disclosure.

In the embodiment, the data bit width may be adjusted according to the error between the data to be quantized and the quantized data corresponding to the data to be quantized, and the adjusted quantization parameter may be obtained by computing according to the adjusted data bit width. By setting different error thresholds, different adjusted quantization parameters may be obtained to achieve different quantization objectives such as improving quantization precision or improving the operation efficiency. The adjusted quantization parameter obtained by computing according to the data to be quantized and the quantized data corresponding to the data to be quantized may be more compatible with the data characteristics of the data to be quantized. In this way, a quantization result that is more suitable to the needs of the data to be quantized may be obtained, and a better balance between the quantization precision and the processing efficiency may be achieved.

In a possible implementation manner, the step S15 may include:

when the quantization error is greater than a first error threshold, increasing the corresponding data bit width to obtain the corresponding adjusted bit width.

The first error threshold may be determined according to the maximum acceptable quantization error. The quantization error may be compared with the first error threshold, when the quantization error is greater than the first error threshold, the quantization error may be considered unacceptable. In this case, the quantization precision needs to be improved. By increasing the data bit width corresponding to the data to be quantized, the quantization precision of the data to be quantized may be improved.

The data bit width corresponding to the data to be quantized may be increased according to a fixed adjustment stride to obtain the adjusted bit width. The fixed adjustment stride may be N bits, where N is a positive integer. Each time the data bit width is adjusted, the data bit width may increase by N bits, and the data bit width after each adjustment=the original data bit width+N bits.

The data bit width corresponding to the data to be quantized may be increased according to a variable adjustment stride to obtain the adjusted bit width. For example, when the difference between the quantization error and the error threshold is greater than the first threshold, the data bit width may be adjusted according to an adjustment stride M1; when the difference between the quantization error and the error threshold is less than the first threshold, the data bit width may be adjusted according to an adjustment stride M2, where the first threshold is greater than the second threshold, and M1 is greater than M2. The variable adjustment stride may be determined according to requirements. The present disclosure does not limit the adjustment stride of the data bit width and whether the adjustment stride is variable.

The adjusted quantization parameter may be obtained by computing the data to be quantized according to the adjusted bit width. The quantized data obtained by re-quantizing the data to be quantized according to the adjusted quantization parameter has higher quantization precision than the quantized data obtained by using the quantization parameter before adjustment.

In a possible implementation manner, the method further includes:

computing an adjusted quantization error of each piece of data to be quantized according to the piece of data to be quantized and the corresponding adjusted bit width; and continuing to increase the corresponding adjusted bit width according to the adjusted quantization error and the first error threshold until the adjusted quantization error is less than or equal to the first error threshold.

When the data bit width corresponding to the data to be quantized is increased according to the quantization error, the adjusted bit width is obtained after the bit width is adjusted once; the adjusted quantization parameter is obtained by computing according to the adjusted bit width; the adjusted quantized data is obtained by quantizing the data to be quantized according to the adjusted quantization parameter; and then the adjusted quantization error of the data to be quantized is obtained by computing according to the adjusted quantized data and the data to be quantized. The adjusted quantization error may be still greater than the first error threshold, in other words, the data bit width obtained after the bit width is adjusted once may not meet the adjustment purpose. When the adjusted quantization error is still greater than the first error threshold, the adjusted data bit width may continue to be adjusted. In other words, the data bit width corresponding to the data to be quantized may be increased multiple times, until the adjusted quantization error obtained according to the final obtained adjusted bit width and the data to be quantized is smaller than the first error threshold.

The adjustment stride by which the data bit width increases for multiple times may be a fixed adjustment stride or a variable adjustment stride. For example, the final data bit width=the original data bit width+B*N bits, where N is a fixed adjustment stride that the original data bit width increases by each time, and B is the increase times of data bit width. The final data bit width=the original data bit width+M1+M2+ . . . +Mm, where M1, M2, . . . , Mm are variable adjustment strides that the original data bit width increases by each time.

In the embodiment, when the quantization error is greater than the first error threshold, the data bit width corresponding to the data to be quantized is increased to obtain the adjusted bit width corresponding to the data to be quantized. The data bit width may be increased by setting the first error threshold and the adjustment stride, so that the adjusted data bit width can meet the quantization requirement. When one adjustment does not meet the adjustment requirement, the data bit width may also be adjusted multiple times. The setting of the first error threshold and the adjustment stride makes it possible to flexibly adjust the quantization parameter according to the quantization requirements so that different quantization requirements may be met and the quantization precision may be adaptively adjusted according to the data features of the data to be quantized.

In a possible implementation manner, the step S15 may include:

when the quantization error is less than a second error threshold, increasing the corresponding data bit width to obtain the corresponding adjusted bit width, where the second error threshold is less than the first error threshold.

The second error threshold may be determined according to the acceptable quantization error and the expected operation efficiency of the neural network. The quantization error may be compared with the second error threshold. When the quantization error is less than the second error threshold, it can be viewed that the quantization error exceeds the expectation, but the operation efficiency is too low to be acceptable. The operation efficiency of the neural network may be improved by decreasing the quantization precision. The quantization precision of the data to be quantized may be decreased by decreasing the data bit width corresponding to the data to be quantized.

The data bit width corresponding to the data to be quantized may be decreased according to a fixed adjustment stride to obtain the adjusted bit width. The fixed adjustment stride may be N bits, where N is a positive integer. Each time the data bit width is adjusted, the data bit width may decrease by N bits. The data bit width after increasing equals the original data bit width-N bits.

The data bit width corresponding to the data to be quantized may be decreased according to a variable adjustment stride to obtain the adjusted bit width. For example, when the difference between the quantization error and the error threshold is greater than the first threshold, the data bit width may be adjusted according to an adjustment stride M1; when the difference between the quantization error and the error threshold is less than the first threshold, the data bit width may be adjusted according to an adjustment stride M2, where the first threshold is greater than the second threshold, and M1 is greater than M2. The variable adjustment stride may be determined according to requirements. The present disclosure does not limit the adjustment stride of the data bit width and whether the adjustment stride is variable.

The adjusted quantization parameter may be obtained by computing the data to be quantized according to the adjusted bit width. The quantized data obtained by re-quantizing the data to be quantized using to the adjusted quantization parameter has higher quantization precision than the quantized data obtained by using the quantization parameter before adjustment.

In a possible implementation manner, the method further includes:
    computing the adjusted quantization error of the data to be quantized according to the adjusted bit width and the data to be quantized; and
    continuing to decrease the adjusted bit width according to the adjusted quantization error and the second error threshold until the adjusted quantization error obtained according to the adjusted bit width and the data to be quantized is greater than or equal to the second error threshold.

When the data bit width corresponding to the data to be quantized is increased according to the quantization error, the adjusted bit width is obtained after the bit width is adjusted once; the adjusted quantization parameter is obtained by computing according to the adjusted bit width; the adjusted quantized data is obtained by quantizing the data to be quantized according to the adjusted quantization parameter; and then the adjusted quantization error of the data to be quantized is obtained by computing according to the adjusted quantized data and the data to be quantized. The adjusted quantization error may be still smaller than the first error threshold. In other words, the data bit width obtained after the bit width is adjusted once may not meet the adjustment purpose. When the adjusted quantization error is still less than the first error threshold, the adjusted data bit width may continue to be adjusted. In other words, the data bit width corresponding to the data to be quantized may be decreased multiple times, until the adjusted quantization error obtained according to the final obtained adjusted bit width and the data to be quantized is greater than the first error threshold.

The adjustment stride that the data bit width decreased by for multiple times may be a fixed adjustment stride or a variable adjustment stride. For example, the final data bit width equals the original data bit width minus B*N bits, where N is a fixed adjustment stride that the original data bit width increases by each time, and B is the increase times of data bit width. The final data bit width equals the original data bit width–M2– . . . –Mm, where M1, M2, . . . , Mm are variable adjustment strides that the original data bit width decreases by each time.

In the embodiment, when the quantization error is less than the second error threshold, the data bit width corresponding to the data to be quantized is decreased to obtain the adjusted bit width corresponding to the data to be quantized. The data bit width may be decreased by setting the second error threshold and the adjustment stride, so that the adjusted data bit width can meet the quantization requirement. When one adjustment cannot not meet the adjustment requirement, the data bit width may be adjusted multiple times. The setting of the second error threshold and the adjustment stride enables the quantization parameter to be flexibly adjusted according to quantization requirements to meet different quantization requirements, so that the quantization precision can be adjusted, and a balance between the quantization precision and the operation efficiency of the neural network may be achieved.

In a possible implementation manner, the method further includes:
    when the quantization error is greater than the first error threshold, increasing the data bit width corresponding to the data to be quantized; when the quantization error is smaller than the second error threshold, decreasing the data bit width corresponding to the data to be quantized; and then obtaining the adjusted bit width corresponding to the data to be quantized.

Two error thresholds may be set at the same time. The first error threshold is used to indicate that the quantization precision is too low, and in this case, the data bit width may be increased. The second error threshold is used to indicate that the quantization precision is too high, and in this case, the data bit width may be decreased. The first error threshold is greater than the second error threshold, and the quantization error of the data to be quantized may be compared with the two error thresholds at the same time. When the quantization error is greater than the first error threshold, the data bit width may be increased; when the quantization error is less than the second error threshold, the data bit width may be decreased; and when the quantization error is between the first error threshold and the second error threshold, the data bit width may remain unchanged.

In the embodiment, by comparing the quantization error with the first error threshold and the second error threshold at the same time, the data bit width may be increased or decreased according to a comparison result, and the data bit width may be adjusted more flexibly by using the first error threshold and the second error threshold, so that the adjustment result of the data bit width is more in compliance with the quantization requirements.

In a possible implementation manner, in the fine-tuning stage and/or training stage of the neural network operation, the method further includes:
    obtaining a variation range of the data to be quantized in a current iteration and historical iterations, where the historical iterations are the iterations before the current iteration; and
    according to the variation range of the data to be quantized, determining a target iteration interval corresponding to the data to be quantized to enable the layer to be quantized to update the quantization parameter of the data to be quantized according to the target iteration interval, where the target iteration interval includes at least one iteration.

A plurality of iterations may occur during the fine-tuning stage and/or training stage of the neural network operation. Each layer to be quantized in the neural network performs a forward operation and a backward operation, and updates the weight of the layer to be quantized to complete an iteration. During a plurality of iterations, the variation range of the data to be quantized and/or the quantized data corresponding to the data to be quantized in the layer to be quantized may be used to determine whether the data to be quantized and/or the quantized data in different iterations can be quantized by using the same quantization parameter. If the variation range of the data to be quantized in the current iteration and the historical iterations is small, for example, less than a preset range variation threshold, the same quantization parameter may be used in a plurality of iterations with smaller variation range.

The quantization parameter corresponding to the data to be quantized may be determined by fetching a pre-stored quantization parameter. When the data to be quantized is quantized in different iterations, it is needed to fetch the quantization parameter corresponding to the data to be quantized in each iteration. If the variation range of the data to be quantized and/or the variation range of the quantized data corresponding to the data to be quantized in a plurality of iterations is small, the same quantization parameter used in the plurality of iterations with small variation range may be temporarily stored. In each iteration, the temporarily stored quantization parameter may be used for quantization, instead of fetching the quantization parameter in each iteration.

The quantization parameter may be obtained by computing according to the data to be quantized and the data bit width. When the data to be quantized is quantized in different iterations, it is needed to compute the quantization parameter in each iteration, respectively. If the variation range of the data to be quantized and/or the quantized data corresponding to the data to be quantized in the plurality of iterations is small, the same quantization parameter may be used in the plurality of iterations with small variation range, in this case, a quantization parameter computed in a first iteration may be used directly in each iteration, instead of computing the quantization parameter in each iteration.

When the data to be quantized is a weight, the weight of each iteration is constantly updated. If the variation range of the weights of a plurality of iterations is small, or the variation range of the quantized data corresponding to the weights of a plurality of iterations is small, the same quantization parameter may be used to quantize the weights of the plurality of iterations.

The target iteration interval may be determined according to the variation range of the data to be quantized. The target iteration interval includes at least one iteration. The same quantization parameter may be used in each iteration within the target iteration interval, in other words, the quantization parameter of the data to be quantized may no longer be updated in each iteration within the target iteration interval. The neural network updates the quantization parameter of the data to be quantized according to the target iteration interval, the preset quantization parameter is not obtained or the quantization parameter is not computed for the iterations within the target iteration interval, in other words, the quantization parameter is not updated in the iterations within the target iteration interval. The preset quantization parameter may be obtained or the quantization parameter may be computed in the iterations outside the target iteration interval, in other words, the quantization parameter is updated in the iterations outside the target iteration interval.

It should be understood that the smaller the variation range of the data to be quantized or the quantized data of the data to be quantized in a plurality of iterations is, the more the count of iterations within the determined target iteration interval will be. According to the computed data variation range, the target iteration interval corresponding to the computed data variation range may be determined by looking up the correspondence between a preset data variation range and an iteration interval. The correspondence between the preset data variation range and the iteration interval may be preset according to needs. According to the computed data variation range, the target iteration interval may be computed by using a preset computation method. The present disclosure does not limit the computation method of the data variation range and the method of obtaining the target iteration interval.

In the embodiment, during the fine-tuning stage and/or training stage of the neural network operation, the variation range of the data to be quantized in the current iteration and historical iterations may be obtained, and the target iteration interval corresponding to the data to be quantized may be determined according to the variation range of the data to be quantized, so that the neural network may update the quantization parameter of the data to be quantized according to the target iteration interval. The target iteration interval may be determined according to the variation range of the data to be quantized or the quantized data corresponding to the data to be quantized in a plurality of iterations. The neural network may determine whether to update the quantization parameter according to the target iteration interval. Since the data variation range of a plurality of iterations within the target iteration interval is small, the quantization precision may be also guaranteed even if the quantization parameter is not updated in the iterations within the target iteration interval. The quantization parameter is not updated in a plurality of iterations within the target iteration interval, which may reduce a count of fetching or computation of the quantization parameter, thereby improving the operation efficiency of the neural network.

In a possible implementation manner, the method further includes:

according to the data bit width of the data to be quantized in the current iteration, determining the data bit width of the data to be quantized in the iterations within the target iteration interval to enable the neural network to determine the quantization parameter according to the data bit width of the data to be quantized in the iterations within the target iteration interval.

As described in the above-mentioned embodiments of the present disclosure, the quantization parameter of the data to be quantized may be preset, or may be computed according to the data bit width corresponding to the data to be quantized. The data bit width corresponding to the data to be quantized in different layers to be quantized or the data bit width corresponding to the data to be quantized in the same layer to be quantized in different iterations may be adaptively adjusted according to the method provided in the above-mentioned embodiments of the present disclosure.

When the data bit width of the data to be quantized cannot be adjusted adaptively and is preset, the data bit width of the data to be quantized in the iterations within the target iteration interval may be determined according to the preset data bit width of the data to be quantized in the current iteration. Each iteration within the target iteration interval may not use its own preset data bit width.

When the data bit width of the data to be quantized can be adjusted adaptively, the data bit width of the data to be quantized in the iterations within the target iteration interval may be determined according to the data bit width of the data to be quantized in the current iteration. When the data bit width can be adjusted adaptively, the data bit width may be adjusted once or multiple times. The data bit width of the data to be quantized after being adaptively adjusted in the current iteration may be used as the data bit width corresponding to each iteration within the target iteration interval, and the data bit width is no longer adaptively adjusted (updated) in each iteration within the target iteration interval. The data to be quantized may use the data bit width after being adaptively adjusted in the current iteration, or may use the data bit width before being adaptively adjusted, which is not limited in the present disclosure.

If the variation range of the data to be quantized does not meet set conditions, the data bit width may be adaptively adjusted in other iterations outside the target iteration interval according to the method provided in the present disclosure to obtain the data bit width that is more in line with the data to be quantized of the current iteration. The computation method of the target iteration interval provided in the present disclosure may also be used to compute a new target iteration interval for use, therefore, the quantization precision of the iterations outside the target iteration interval is ensured, and the operation efficiency of the neural network is also improved.

The data bit width of each iteration within the target iteration interval is the same, and for each iteration, the corresponding quantization parameter may be computed according to the same data bit width. The quantization parameter may include at least one of a point position, a scaling factor, and an offset. The quantization parameter may be computed respectively in each iteration within the target iteration interval according to the same data bit width. When the quantization parameter includes the point position (including the first type of point position and the second type of point position), the scaling factor (including the first type of scaling factor and the second type of scaling factor), and the offset, in each iteration within the target iteration interval, the same data bit width may be used to compute the corresponding point position, scaling factor and offset, respectively.

While determining the data bit width of each iteration within the target iteration interval according to the data bit width of the current iteration, the corresponding quantization parameter of each iteration within the target iteration interval may be determined according to the quantization parameter of the current iteration. The quantization parameter of each iteration within the target iteration interval may not be computed again based on the same data bit width, which may further improve the operation efficiency of the neural network. The corresponding quantization parameter of each iteration within the target iteration interval may be determined according to all quantization parameters or part of the quantization parameters of the current iteration. When the corresponding quantization parameter of each iteration within the target iteration interval is determined according to part of the quantization parameters of the current iteration, the remaining quantization parameters still need to be computed in each iteration within the target iteration interval.

For example, the quantization parameter includes the second type of point position, the second type of scaling factor, and the offset. The data bit width and the second type of point position of each iteration within the target iteration interval may be determined according to the data bit width and the second type of point position of the current iteration. In this way, the second type of scaling factor and offset of each iteration within the target iteration interval need to be computed based on the same data bit width. The data bit width, the second type of point position, the second type of scaling factor, and the offset of each iteration within the target iteration interval may also be determined according to the data bit width, the second type of point position, the second type of scaling factor, and the offset of the current iteration, in this case, the quantization parameter of each iteration within the target iteration interval does not need to be computed.

In the embodiment, according to the data bit width of the data to be quantized in the current iteration, the data bit width of the data to be quantized in the iterations within the target iteration interval may be determined to enable the neural network to determine the quantization parameter according to the data bit width of the data to be quantized in the iterations within the target iteration interval. The data bit width of each iteration within the target iteration interval may be determined according to the data bit width of the current iteration. Since the variation range of the data to be quantized in each iteration within the target iteration interval meets the preset conditions, the method of computing the quantization parameter by using the same data bit width may ensure the quantization precision of each iteration within the target iteration interval. Each iteration within the target iteration interval uses the same data bit width, which may also improve the operation efficiency of the neural network. In this way, a balance may be achieved between the accuracy of the operation result of the neural network after being quantized and the operation efficiency of the neural network.

In a possible implementation manner, the method further includes according to the point position of the data to be quantized in the current iteration, determining the point position of the data to be quantized in the iterations within the target iteration interval, where the point position includes the first type of point position and/or the second type of point position.

The first type of point position of the data to be quantized in the iterations within the target iteration interval may be determined according to the first type of point position of the data to be quantized in the current iteration. The second type of point position of the data to be quantized in the iterations within the target iteration interval may be determined according to the second type of point position of the data to be quantized in the current iteration.

Among the quantization parameters, compared with the scaling factor and the offset, different point positions may have a greater impact on the quantization result of the same data to be quantized. The point position corresponding to the iterations within the target iteration interval may be determined according to the point position of the data to be quantized in the current iteration. When the data bit width cannot be adjusted adaptively, the preset point position of the data to be quantized in the current iteration may be used as the point position of the data to be quantized in each iteration within the target iteration interval; or the point position of the data to be quantized in the current iteration computed according to the preset data bit width may be used as the point position of the data to be quantized in each iteration within the target iteration interval. When the data bit width can be adjusted adaptively, the point position of the data to be quantized adjusted in the current iteration may be used as the point position of the data to be quantized in each iteration within the target iteration interval.

The point position of the data to be quantized in the iterations within the target iteration interval may be determined according to the point position of the data to be quantized in the current iteration, at the same time, the scaling factor of the data to be quantized in the iterations within the target iteration interval may be determined according to the scaling factor of the data to be quantized in the current iteration; and/or the offset of the data to be quantized in the iterations within the target iteration interval may be determined according to the offset of the data to be quantized in the current iteration.

The point position of the data to be quantized in the iterations within the target iteration interval may be determined according to the point position of the data to be quantized in the current iteration, at the same time, the data bit width of the data to be quantized in the iterations within the target iteration interval may be determined according to the data bit width of the data to be quantized in the current iteration, where the data bit width of the data to be quantized in the current iteration may be a preset data bit width of the current iteration or may be a data bit width after being adaptively adjusted.

In the embodiment, the point position of the data to be quantized in the iterations within the target iteration interval may be determined according to the point position of the data to be quantized in the current iteration. The point position in each iteration within the target iteration interval may be determined according to the point position in the current iteration. Since the variation range of the data to be quantized in each iteration within the target iteration interval meets the preset conditions, the method of using the same point position can ensure the quantization precision of each iteration within the target iteration interval. Using the same point position in each iteration within the target iteration interval can also improve the operation efficiency of the neural network. In this way, a balance may be achieved between the accuracy of the operation result of the neural network after being quantized and the operation efficiency of the neural network.

In a possible implementation manner, the obtaining the variation range of the data to be quantized in the current iteration and historical iterations may include:

according to the point position of the data to be quantized in the current iteration and the point position in a historical iteration that corresponds to the current iteration and that is determined according to a historical iteration interval, computing a moving average of the point positions of the data to be quantized in the respective iteration intervals, where the point positions include the first type of point position and/or the second type of point position; and obtaining a first data variation range according to a first moving average of the point position of the data to be quantized in the current iteration and a second moving average of the point position in an iteration corresponding to a previous iteration interval.

The determining of the target iteration interval corresponding to the data to be quantized according to the variation range of the data to be quantized to enable the neural network to update the quantization parameter of the data to be quantized according to the target iteration interval may include:

determining the target iteration interval corresponding to the data to be quantized according to the first data variation range to enable the neural network to update the quantization parameter of the data to be quantized according to the target iteration interval.

According to the first type of point position of the data to be quantized in the current iteration and the first type of point position in the historical iteration corresponding to the current iteration determined according to the historical iteration interval, a moving average of the first type of point positions of the data to be quantized in the respective iteration intervals may be determined. According to a first moving average of the first type of point position of the data to be quantized in the current iteration, and a second moving average of the first type of point position in an iteration corresponding to a previous iteration interval, the variation range of the data to be quantized may be obtained. Alternatively, according to the second type of point position of the data to be quantized in the current iteration and the second type of point position in the historical iteration corresponding to the current iteration determined according to the historical iteration interval, a moving average of the second type of point positions of the data to be quantized in the respective iteration intervals may be determined. According to a first moving average of the second type of point position of the data to be quantized in the current iteration, and a second moving average of the second type of point position in an iteration corresponding to a previous iteration interval, the variation range of the data to be quantized may be obtained.

In a possible implementation manner, the historical iteration corresponding to the current iteration determined according to the historical iteration interval may be a historical iteration for computing the target iteration interval. The correspondence between the current iteration and the corresponding target iteration interval may include the following.

The target iteration interval may be computed from the current iteration, and the target iteration interval may be recomputed from a next iteration after the target iteration interval corresponding to the current iteration ends. For example, the current iteration is the $100^{th}$ iteration, and the target iteration interval is 3, then the iterations within the target iteration interval include the $100^{th}$ iteration, the $101^{th}$ iteration, and the $102^{th}$ iteration; the target iteration interval corresponding to the $103^{th}$ iteration may be computed in the $103^{th}$ iteration, and a first iteration within the target iteration interval may be computed from the $103^{th}$ iteration. At this time, the current iteration is the $103^{th}$ iteration, and the historical iteration corresponding to the current iteration determined according to the historical iteration interval is the $100^{th}$ iteration.

The target iteration interval may be counted from the next iteration after the current iteration, and the target iteration interval may be recomputed from the last iteration within the target iteration interval. For example, the current iteration is the 100-th iteration, and the target iteration interval is 3, then the iterations within the target iteration interval include the 101-th iteration, the 102-th iteration, and the 103-th iteration; the target iteration interval corresponding to the 103-th iteration may be computed in the 103-th iteration, and a first iteration within the target iteration interval may be computed from the 104-th iteration. At this time, the current iteration is the 103-th iteration, and the historical iteration corresponding to the current iteration determined according to the historical iteration interval is the 100-th iteration.

The target iteration interval may be counted from a next iteration after the current iteration, and the target iteration interval may be recomputed from the next iteration after the target iteration interval ends. For example, the current iteration is the 100-th iteration, and the target iteration interval is 3, then the iterations within the target iteration interval include the 101-th iteration, the 102-th iteration, and the 103-th iteration; the target iteration interval corresponding to the 104-th iteration may be computed in the 104-th iteration, and a first iteration within the target iteration interval may be computed from the 105-th iteration. At this time, the current iteration is the 104-th iteration, and the historical iteration corresponding to the current iteration determined according to the historical iteration interval is the 100-th iteration.

Other correspondences between the current iteration and the target iteration interval may be determined according to requirements. For example, the target iteration interval may be counted from an N-th iteration after the current iteration, where N is greater than 1, which is not limited in the present disclosure.

It should be understood that the computed moving average of the point positions of the data to be quantized corresponding to the respective iteration intervals may include the first moving average of the point position of the data to be quantized in the current iteration, and the second moving average of the point position of the data to be quantized in the iteration corresponding to the previous iteration interval. The first moving average $m^{(t)}$ of the point position corresponding to the current iteration may be computed based on the formula (27):

$$m^{(t)} \leftarrow \alpha \times s^{(t)} + (1-\alpha) \times m^{(t-1)} \qquad \text{formula (27)}$$

where t is the current iteration; t−1 is the historical iteration determined according to the previous iteration interval; $m^{(t-1)}$ is the second moving average of the historical iteration determined according to the previous iteration interval; $s^{(t)}$ is the point position of the current iteration, which may be the first type of point position or the second type of point position; a is a first parameter, where the first parameter may be a hyper-parameter.

In the embodiment, the moving average of the point positions of the data to be quantized in the respective iteration intervals may be computed according to the point position of the data to be quantized in the current iteration and the point position in the historical iteration corresponding to the current iteration determined according to the historical iteration interval; and the first data variation range may be obtained according to the first moving average of the point position of the data to be quantized in the current iteration and the second moving average of the point position in the iteration corresponding to the previous iteration interval. The target iteration interval corresponding to the data to be quantized may be determined according to the first data variation range to enable the neural network to update the quantization parameter of the data to be quantized according to the target iteration interval. Since the first data variation range may be used to indicate the variation trend of the point position, the target iteration interval may vary with the variation trend of the point position of the data to be quantized, and the size of each computed target iteration interval may also vary with the variation trend of the point position of the data to be quantized. Since the quantization parameter is determined according to the target iteration interval, the quantized data obtained according to the quantization parameter may be more in line with the variation trend of the point position of the data to be quantized, which may improve the operation efficiency of the neural network while ensuring the quantization precision.

In a possible implementation manner, the obtaining of the first data variation range according to the first moving average of the point position of the data to be quantized in the current iteration and the second moving average of the point position in the iteration corresponding to the previous iteration interval may include:

computing a difference between the first moving average and the second moving average; and
determining an absolute value of the difference as the first data variation range.

The first data variation range $\text{diff}_{update1}$ may be computed based on the formula (28):

$$\text{diff}_{update1} = |m^{(t)} - m^{(t-1)}| = \alpha|s^{(t)} - m^{(t-1)}| \qquad \text{formula (28)}$$

The target iteration interval corresponding to the data to be quantized may be determined according to the first data variation range to enable the neural network to update the quantization parameter of the data to be quantized according to the target iteration interval. The target iteration interval I may be computed based on the formula (29).

$$I = \frac{\beta}{\text{diff}_{update1}} - \gamma \qquad \text{formula (29)}$$

where is $\beta$ a second parameter, and $\gamma$ is a third parameter, where the second parameter and the third parameter may be hyper-parameters.

It should be understood that the first data variation range may be used to indicate the variation trend of the point position. The greater the first data variation range is, the greater the range variation of the quantized data will be, in this case, when the quantization parameter is updated, a shorter target iteration interval I is required.

In the embodiment, the difference between the first moving average and the second moving average may be computed; and the absolute value of the difference may be determined as the first data variation range. The accurate first data variation range may be obtained according to the difference between the moving averages.

In a possible implementation manner, the method further includes obtaining a second data variation range according to the data to be quantized and the quantized data corresponding to the data to be quantized in the current iteration.

The determining the target iteration interval corresponding to the data to be quantized according to the variation range of the data to be quantized to enable the neural network to update the quantization parameter of the data to be quantized according to the target iteration interval may include:

determining the target iteration interval corresponding to the data to be quantized according to the first data variation range and the second data variation range of the data to be quantized to enable the neural network to update the quantization parameter of the data to be quantized according to the target iteration interval.

The second data variation range may be obtained according to the data to be quantized and the quantized data corresponding to the data to be quantized in the current iteration. The second data variation range may be also obtained according to the data to be quantized and the de-quantized data corresponding to the data to be quantized in the current iteration.

Similarly, the second data variation range $\text{diff}_{bit}$ of the data to be quantized and the de-quantized data corresponding to the data to be quantized in the current iteration may be computed based on the formula (30). The second data variation range $\text{diff}_{bit}$ of the data to be quantized and the de-quantized data corresponding to the data to be quantized may be also computed based on another error computation method, which is not limited in the present disclosure.

$$\text{diff}_{bit} = \log_2\left(\frac{\sum_i |z_i^{(n)}| - \sum_i |z_i|}{\sum_i |z_i|} + 1\right) \qquad \text{formula (30)}$$

where $z_i$ is the data to be quantized, and $z_i^{(n)}$ is the de-quantized data corresponding to the data to be quantized. It should be understood that the second data variation range may be used to indicate the variation trend of the data bit width of the data to be quantized. The greater the second data variation range is, the more likely the data to be quantized needs to update the corresponding data bit width, and a shorter iteration is needed for updating. The greater the second data variation range is, the smaller the target iteration interval will be required.

In the embodiment, the second data variation range may be obtained according to the data to be quantized and the quantized data corresponding to the data to be quantized in the current iteration. The target iteration interval corresponding to the data to be quantized may be determined according to the first data variation range and the second data variation range of the data to be quantized to enable the neural network to update the quantization parameter of the data to be quantized according to the target iteration interval. Since the second data variation range may be used to indicate the variation requirements of the data bit width, the target iteration interval computed according to the first data variation range and the second data variation range may track the variation of the point position and the data bit width at the same time. In this way, the target iteration interval may better meet the data quantization requirements of the data to be quantized.

In a possible implementation manner, the obtaining the second data variation range according to the data to be quantized and the quantized data corresponding to the data to be quantized in the current iteration may include:

computing an error between the data to be quantized and the quantized data corresponding to the data to be quantized in the current iteration; and determining a square of the error as the second data variation range.

The second data variation range $\text{diff}_{update2}$ may be computed based on the formula (31):

$$\text{diff}_{update2} = \delta * \text{diff}_{bit}^2 \qquad \text{formula (31)}$$

where $\delta$ is a fourth parameter which may be a hyper-parameter.

It should be understood that different quantization parameters may be obtained according to different data bit widths, and then different quantized data may be obtained, in this case, different second data variation ranges may be generated. The second data variation range may be used to indicate the variation trend of the data bit width. The greater the second data variation range is, the shorter target iteration interval will be needed to update the data bit width more frequently, in other words, the target iteration interval needs to be smaller.

In a possible implementation manner, the determining the target iteration interval corresponding to the data to be quantized according to the first data variation range and the second data variation range of the data to be quantized may include:

determining the target iteration interval corresponding to the data to be quantized according to the maximum of the first data variation range and the second data variation range.

The target iteration interval may be computed based on the formula (32), $$I = \frac{\beta}{\max(\text{diff}_{update1}, \text{diff}_{update2})} - \gamma \qquad \text{formula (32)}$$

where is $\beta$ a second parameter, and $\gamma$ is a third parameter, where the second parameter and the third parameter may be hyper-parameters.

The variation trend of the data bit width and the point position may be indicated at the same time according to the target iteration interval obtained by using the first data variation range and the second data variation range. When the variation trend of one of the first data variation range and the second data variation range increases, the target iteration interval may vary accordingly. The target iteration interval may track the variation of the data bit width and the point position at the same time and make corresponding adjustments, so that the quantization parameter updated according to the target iteration interval may be more in line with the variation trend of the target data, and then the quantized data obtained according to the quantization parameter may better meet the quantization requirements.

In a possible implementation manner, the obtaining of the variation range of the data to be quantized in the current iteration and historical iterations may include:

when the current iteration is outside an update period, obtaining the data variation range of the data to be quantized in the current iteration and the historical iterations, where the update period includes at least one iteration.

In the training process and/or fine-tuning process of the neural network operation, the data to be quantized varies greatly in a plurality of iterations at the beginning of training or fine-tuning. If the target iteration interval is computed in the plurality of iterations at the beginning of training or fine-tuning process, the computed target iteration interval may lose its usefulness. According to a preset update period, the target iteration interval is not computed in each iteration within the update period, and the target iteration interval is not applicable. A plurality of iterations may use the same data bit width or point position.

When the iteration goes outside the update period, in other words, when the current iteration is outside the update period, the data variation range of the data to be quantized in the current iteration and the historical iterations may be obtained; and the target iteration interval corresponding to the data to be quantized may be determined according to the variation range of the data to be quantized to enable the neural network to update the quantization parameter of the data to be quantized according to the target iteration interval. For example, if a preset update period is 100 iterations, then the target iteration interval is not computed from the first iteration to the 100-th iteration. When the iteration goes to the 101-th iteration, in other words, when the current iteration is the 101-th iteration, the current iteration is outside the update period, at this time, the target iteration interval corresponding to the data to be quantized in the 101-th iteration may be determined according to the variation range of the data to be quantized in the 101-th iteration and iterations from the first iteration to the 100-th iteration, and the computed target iteration interval may be used in the 101-th iteration or an iteration at an interval of a preset count of iterations from the 101-th iteration.

The update period may be counted from the preset count of iterations. For example, a plurality of iterations in the update period may be counted starting from the first iteration, or a plurality of iterations in the update period may be counted starting from the N-th iteration, which is not limited in the present disclosure.

In the embodiment, when an iteration goes outside the update period, the target iteration interval may be computed and used, which may avoid the problem that the target iteration interval is of little significance due to the greater variation of the data to be quantized in the early stage of the training process or fine-tuning process of the neural network operation, and the operation efficiency of the neural network may be further improved when the target iteration interval is used.

In a possible implementation manner, the method further includes:

when the current iteration is within the preset period, determining a period interval according to the current iteration, an iteration corresponding to the current iteration in a next period after the preset period, and an iteration interval corresponding to the current iteration;

determining the data bit width of the data to be quantized in the iteration within the period interval according to the data bit width of the data to be quantized corresponding to the current iteration; or determining the point position of the data to be quantized in the iteration within the period interval according to the point position of the data to be quantized corresponding to the current iteration.

There are a plurality of periods in the training process or fine-tuning process of the neural network operation, where each period may include a plurality of iterations. The process in which the entire data used for the neural network operation is computed once is referred to as a period. During the training process, as the iteration progresses, the weights of the neural network tend to be stable. After the training becomes stable, the data to be quantized such as the neuron, weight, bias and gradient tend to become stable. When the data to be quantized tends to be stable, the data bit width and quantization parameter of the data to be quantized also tend to be stable. Similarly, in the fine-tuning process, after the fine-tuning is stable, the data bit width and quantization parameter of the data to be quantized also tend to be stable.

Therefore, a preset period may be determined according to a period in which the training is stable or the fine-tuning is stable. The period after the period in which the training is stable or the fine-tuning is stable may be determined as the preset period. For example, if the training is stable in the M-th period, the period after the M-th period may be determined as the preset period. In the preset period, a target iteration interval may be computed every other period, and the data bit width or the quantization parameter may be adjusted once according to the computed target iteration interval to reduce the update times of the data bit width or the quantization parameter and improve the operation efficiency of the neural network.

For example, the preset period is a period after the M-th period. In the M+1-th period, the target iteration interval computed according to the P-th iteration in the M-th period ends at the Q-th iteration in the M+1-th period, and the corresponding target iteration interval $I_{m+1}$ is computed according to the $Q_{m+1}$-th iteration in the M+1-th period. In the M+2-th period, the iteration corresponding to the $Q_{m+1}$-th iteration in the M+1-th period is the $Q_{m+2}$-th iteration. The period interval starts from the $Q_{m+1}$-th iteration in the M+1-th period and ends at the $Q_{m+2}+I_{m+1}$-th iteration in the M+2-th period. In each iteration within the period interval, quantization parameters such as the data bit width or point position determined according to the $Q_{m+1}$-th iteration in the M+1-th period may be used.

In the embodiment, the period interval may be fixed or predetermined. After the training or fine-tuning stage of the neural network operation is stable, the quantization parameters such as the data bit width or the point position may be updated every period according to the period interval. After the training or fine-tuning stage is stable, the method of reducing the update times of the data bit width or the point position according to the period interval may improve the operation efficiency of the neural network while ensuring the quantization precision.

It should be noted that, the foregoing embodiments of method, for the sake of conciseness, are all described as a series of combinations of actions, but those skilled in the art should know that the present disclosure is not limited by the described order of action since the steps may be performed in a different order or simultaneously according to the present disclosure. Secondly, those skilled in the art should also understand that the embodiments described in the specification are all optional, and the actions and modules involved are not necessarily required for this disclosure.

Furtherer, it should be explained that though the steps in the flowchart FIG. 2 and FIG. 5 are shown by following the direction of arrows, these steps are not necessarily performed according to the order indicated by the arrows. Unless clearly stated herein, the order for performing these steps is not strictly restricted. These steps may be performed in a different order. Additionally, at least part of the steps shown in FIG. 2 and FIG. 5 may include a plurality of sub-steps or a plurality of stages. These sub-steps or stages may not necessarily be performed and completed at the same time, instead, these sub-steps or stages may be performed at different time. These sub-steps or stages may not necessarily be performed sequentially either, instead, these sub-steps or stages may be performed in turn or alternately with at least part of other steps, or sub-steps of other steps, or stages.

An aspect of the present disclosure provides a non-transitory computer readable storage medium where a computer program instruction is stored. When the computer program instruction is executed by a processor, the neural network quantization method is realized.

Figure 6:
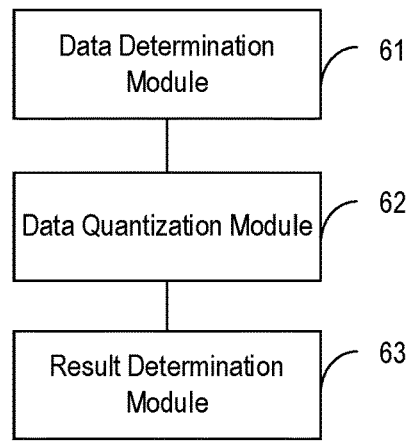
FIG. 6 shows a block diagram of a neural network quantization device according to an embodiment of the present disclosure.

FIG. 6 shows a block diagram of a neural network quantization device according to an embodiment of the present disclosure. As shown in FIG. 6, the device is applied to a processor 100 shown in FIG. 1, and the device includes a data determination module 61, a data quantization module 62 and a result determination module 63. A processing unit 101 is provided with a data determination module 61, a data quantization module 62, and a result determination module 63. Alternatively, the data determination module 61, the data quantization module 62, and the result determination module 63 are respectively arranged in different processing units 101. A storage unit 102 is configured to store data related to the operation of the data determination module 61, the data quantization module 62, and the result determination module 63, such as the data to be quantized, a quantization parameter, and a data bit width.

The data determination module 61 is configured to determine a plurality of pieces of data to be quantized in target data of a layer to be quantized according to a storage capacity of a terminal running a neural network, where the target data is any batch of data to be operated in the layer to be quantized and the data to be operated includes at least one of input neurons and/or gradients.

The data quantization module 62 is configured to use a loop processing method to quantize each piece of data to be quantized according to a corresponding quantization parameter to obtain a piece of quantized data corresponding to the piece of data to be quantized.

The result determination module 63 is configured to obtain a quantization result of the target data according to the pieces of quantized data corresponding to the pieces of data to be quantized, so that an operation may be performed in the layer to be quantized according to the quantization result of the target data.

In a possible implementation manner, the data quantization module includes:
　a data to be quantized determination sub-module configured to start a current loop processing process after a previous loop processing process ends, and determine a piece of data to be quantized after a piece of data to be quantized that is quantized in the previous loop processing process as a current piece of data to be quantized that is to be quantized in the current loop processing process;
　a comparison sub-module configured to compare a statistical result of the current piece of data to be quantized with a stored reference statistical result to obtain a comparison result;
　a statistical result determination sub-module configured to, when the comparison result meets a quantization parameter operation condition, determine an updated statistical result according to the statistical result of the current piece of data to be quantized and the reference statistical result;
　a first quantization parameter determination sub-module configured to determine a quantization parameter corresponding to the current piece of data to be quantized according to the updated statistical result and a corresponding data bit width; and
　a quantization processing sub-module configured to quantize the current piece of data to be quantized according to the corresponding quantization parameter to obtain a piece of quantized data corresponding to the current piece of data to be quantized, and finish the current loop processing process.

In a possible implementation manner, the data quantization module further includes:
　a reference data updating module configured to store the updated statistical result and the quantization parameter corresponding to the updated statistical result as a new reference statistical result and a new reference quantization parameter, respectively.

In a possible implementation manner, the data quantization module further includes:
　a second quantization determination sub-module configured to, when the comparison result does not meet the quantization parameter operation condition, determine a reference quantization parameter corresponding to the reference statistical result as the quantization parameter of the current piece of data to be quantized.

In a possible implementation manner, the statistical result of the current piece of data to be quantized includes a maximum value and a minimum value in the current piece of data to be quantized, and the reference statistical result includes a reference maximum value and a reference minimum value.

When the comparison result meets the quantization parameter operation condition and the statistical result determination sub-module determines an updated statistical result according to the statistical result of the current piece of data to be quantized and the reference statistical result, any of the following methods may be included:
　when the maximum value in the current piece of data to be quantized is greater than the reference maximum value, and the minimum value in the current piece of data to be quantized is less than the reference minimum value, determining the statistical result of the current piece of data to be quantized as the updated statistical result;
　when the maximum value in the current piece of data to be quantized is less than or equal to the reference maximum value, and the minimum value in the current piece of data to be quantized is less than the reference minimum value, determining the reference maximum value and the minimum value in the current piece of data to be quantized as the updated statistical result; and
　when the maximum value in the current piece of data to be quantized is greater than the reference maximum value, and the minimum value in the current piece of data to be quantized is less than the reference minimum value, determining the maximum value in the current piece of data to be quantized and the reference minimum value as the updated statistical result.

In a possible implementation manner, the first quantization parameter determination sub-module determines a quantization parameter corresponding to the current piece of data to be quantized according to the updated statistical result and a corresponding data bit width includes:
　when the quantization parameter includes an offset, the first quantization parameter determination sub-module obtains a second type of point position of each piece of data to be quantized according to the maximum and the minimum of each piece of data to be quantized and the corresponding data bit width.

In a possible implementation manner, the device further includes:
　a parameter determination sub-module configured to compute the corresponding quantization parameter according to each piece of data to be quantized and the corresponding data bit width.

In a possible implementation manner, the parameter determination sub-module includes:
　a first point position determination sub-module configured to, when the quantization parameter does not include the offset, obtain a first type of point position of each piece of data to be quantized according to the maximum of the absolute value of each piece of data to be quantized and the corresponding data bit width.

In a possible implementation manner, the parameter determination sub-module includes:
　a first maximum determination sub-module configured to, when the quantization parameter does not include the offset, obtain the maximum of the piece of quantized data according to each piece of data to be quantized and the corresponding data bit width; and
　a first scaling factor determination sub-module configured to obtain a first type of scaling factor of each piece of data to be quantized according to the maximum of the absolute value of each piece of data to be quantized and the maximum of the piece of quantized data.

In a possible implementation manner, the parameter determination sub-module includes:
　a second point position determination sub-module configured to, when the quantization parameter includes the offset, obtain a second type of point position of each piece of data to be quantized according to the maximum and the minimum of each piece of data to be quantized and the corresponding data bit width. Alternatively, when the quantization parameter includes the offset, a second type of point position of each piece of data to be quantized may be obtained according to the maximum and the minimum of the updated statistical result and the corresponding data bit width.

In a possible implementation manner, the parameter determination sub-module includes:
a second maximum determination sub-module configured to, when the quantization parameter includes the offset, obtain the maximum of the piece of quantized data according to each piece of data to be quantized and the corresponding data bit width; and
a first scaling factor determination sub-module configured to obtain a second type of scaling factor of each piece of data to be quantized according to the maximum and the minimum of the piece of data to be quantized, and the maximum of the piece of quantized data. Alternatively, the second type of scaling factor of each piece of data to be quantized may be obtained according to the maximum and the minimum in the updated statistical result as well as the maximum of the piece of quantized data.

In a possible implementation manner, the parameter determination sub-module includes:
an offset determination sub-module configured to obtain the offset of each piece of data to be quantized according to the maximum and the minimum of each piece of data to be quantized. Alternatively, the offset of each piece of data to be quantized may be obtained according to the maximum and the minimum in the updated statistical result.

In a possible implementation manner, the device further includes:
a first quantization error determination module configured to determine a quantization error corresponding to each piece of data to be quantized according to each piece of data to be quantized and the piece of quantized data corresponding to each piece of data to be quantized;
an adjusting bit width determination module configured to adjust the data bit width of each piece of data to be quantized to obtain an adjusted bit width corresponding to each piece of data to be quantized according to the quantization error and an error threshold corresponding to each piece of data to be quantized, and
an adjusting quantization parameter determination module configured to update the data bit width corresponding to each piece of data to be quantized to the corresponding adjusted bit width, and compute a corresponding adjusted quantization parameter according to each piece of data to be quantized and the corresponding adjusted bit width to quantize each piece of data to be quantized according to the corresponding adjusted quantization parameter.

In a possible implementation manner, the adjusting bit width determination module includes:
a first adjusting bit width determination sub-module configured to, when the quantization error is greater than a first error threshold, increase the corresponding data bit width to obtain the corresponding adjusted bit width.

In a possible implementation manner, the device further includes:
a first adjusted quantization error module configured to compute an adjusted quantization error of each piece of data to be quantized according to the piece of data to be quantized and the corresponding adjusted bit width; and
a first adjustment bit width loop determination module configured to continue to increase the corresponding adjusted bit width according to the adjusted quantization error and the first error threshold until the adjusted quantization error is less than or equal to the first error threshold.

In a possible implementation manner, the adjusting bit width determination module includes:
a second adjusting bit width determination sub-module configured to, when the quantization error is less than a second error threshold, increase the corresponding data bit width to obtain the corresponding adjusted bit width, where the second error threshold is less than the first error threshold.

In a possible implementation manner, the device further includes:
a second adjusted quantization error module configured to compute the adjusted quantization error of the data to be quantized according to the adjusted bit width and the data to be quantized; and
a second adjustment bit width loop determination module configured to continue to decrease the adjusted bit width according to the adjusted quantization error and the second error threshold until the adjusted quantization error obtained according to the adjusted bit width and the data to be quantized is greater than or equal to the second error threshold.

In a possible implementation manner, during a fine-tuning stage and/or training stage of a neural network operation, the device further includes:
a first data variation range determination module configured to obtain a variation range of the data to be quantized in a current iteration and historical iterations, where the historical iterations are the iterations before the current iteration; and
a target iteration interval determination module configured to, according to the variation range of the data to be quantized, determine a target iteration interval corresponding to the data to be quantized to enable the layer to be quantized to update the quantization parameter of the data to be quantized according to the target iteration interval, where the target iteration interval includes at least one iteration.

In a possible implementation manner, the device further includes:
a first target iteration interval application module configured to, according to the data bit width of the data to be quantized in the current iteration, determine the data bit width of the data to be quantized in the iterations within the target iteration interval to enable the neural network to determine the quantization parameter according to the data bit width of the data to be quantized in the iterations within the target iteration interval.

In a possible implementation manner, the device further includes:
a second target iteration interval application module configured to, according to the point position of the data to be quantized in the current iteration, determine the point position of the data to be quantized in the iterations within the target iteration interval, where the point position includes the first type of point position and/or the second type of point position.

In a possible implementation manner, the first data variation range determination module includes:
- a moving average computation sub-module configured to, according to the point position of the data to be quantized in the current iteration and the point position in the historical iteration corresponding to the current iteration determined according to a historical iteration interval, compute a moving average of the point positions of the data to be quantized in the respective iteration intervals, where the point position includes the first type of point position and/or the second type of point position; and
- a first data variation range determination sub-module configured to obtain a first data variation range according to a first moving average of the point position of the data to be quantized in the current iteration and a second moving average of the point position in an iteration corresponding to a previous iteration interval.

The target iteration interval determination module includes:
- a first target iteration interval determination sub-module configured to determine the target iteration interval corresponding to the data to be quantized according to the first data variation range to enable the neural network to update the quantization parameter of the data to be quantized according to the target iteration interval.

In a possible implementation manner, the first data variation range determination sub-module includes:
- a first range determination sub-module configured to compute a difference between the first moving average and the second moving average, and determine the absolute value of the difference as the first data variation range.

In a possible implementation manner, the device further includes:
- a second data variation range determination module configured to obtain a second data variation range according to the data to be quantized and the quantized data corresponding to the data to be quantized in the current iteration.

The target iteration interval determination module may further include:
- a second target iteration interval determination sub-module configured to determine the target iteration interval corresponding to the data to be quantized according to the first data variation range and the second data variation range of the data to be quantized to enable the neural network to update the quantization parameter of the data to be quantized according to the target iteration interval.

In a possible implementation manner, the second data variation range determination module may include:
- a second range determination sub-module configured to compute an error between the data to be quantized and the quantized data corresponding to the data to be quantized in the current iteration, and determine a square of the error as the second data variation range.

In a possible implementation manner, the second target iteration interval determination sub-module may include:
- a range determination sub-module configured to determine the target iteration interval corresponding to the data to be quantized according to the maximum of the first data variation range and the second data variation range.

In a possible implementation manner, the first data variation range determination module includes:
- a second data variation range determination sub-module configured to, when the current iteration is outside an update period, obtain the data variation range of the data to be quantized in the current iteration and the historical iterations, where the update period includes at least one iteration.

In a possible implementation manner, the device further includes:
- a period interval determination module configured to, when the current iteration is within the preset period, determine a period interval according to the current iteration, an iteration corresponding to the current iteration in a next period after the preset period, and an iteration interval corresponding to the current iteration;
- a first period interval application module configured to determine the data bit width of the data to be quantized in the iteration within the period interval according to the data bit width of the data to be quantized corresponding to the current iteration; or
- a second period interval application module configured to determine the point position of the data to be quantized in the iteration within the period interval according to the point position of the data to be quantized corresponding to the current iteration.

According to the neural network quantization device provided in the embodiments of the present disclosure, a plurality of pieces of data to be quantized in the target data may be separately quantized according to the corresponding quantization parameter, which may reduce the storage space of data while ensuring the precision, ensure the accuracy and reliability of the operation result, and improve the operation efficiency. In addition, performing quantization may also reduce the size of the neural network model and relax the performance requirements of a terminal running the neural network model, so that the neural network model may be applied to terminals such as mobile phones with relatively limited computing power, size, and power consumption.

It should be understood that the foregoing device embodiments are only illustrative, and the device of the present disclosure may also be implemented in other ways. For example, the division of the units/modules in the foregoing embodiment may just be a logical function division, and there may be other division methods in actual implementation. For example, a plurality of units, modules, or components may be combined or integrated into another system, or some features may be omitted or not implemented.

In addition, unless otherwise specified, the functional units/modules in the various embodiments of the present disclosure may be integrated into one unit/module. Alternatively, each unit/module may exist alone physically. Alternatively, two or more units/modules may be integrated together. The above-mentioned integrated units/modules can be implemented in the form of hardware or in the form of software program modules.

The above-mentioned integrated units/modules can be implemented in the form of hardware. The hardware may be a digital circuit, an analog circuit, and the like. Physical implementation of the hardware structure may include, but is not limited to, a transistor, a memristor, and the like. Unless otherwise specified, the artificial intelligence processor may be any appropriate hardware processor, such as CPU, GPU, FPGA, DSP, ASIC, and the like. Unless otherwise specified, the storage unit may be any suitable magnetic storage medium or magneto-optical storage medium, such as RRAM (Resistive Random Access Memory), DRAM (Dynamic Random Access Memory), SRAM (Static Random-Access Memory), EDRAM (Enhanced Dynamic Random Access Memory), HBM (High-Bandwidth Memory), HMC (Hybrid Memory Cube), and the like.

The integrated units/modules may be implemented in the form of software program modules and sold or used as an independent product. The product can be stored in a computer-readable memory. Based on such understanding, the essence of the technical solutions of the present disclosure, or a part of the present disclosure that contributes to the prior art, or all or part of technical solutions, can all or partly embodied in the form of a software product that is stored in a memory. The software product includes several instructions to enable a computer device (which may be a personal computer, a server, or a network device, etc.) to perform all or part of the steps of the methods described in the examples of the present disclosure. The foregoing memory includes: a USB flash drive, a read-only memory (ROM), a random access memory (RAM), a mobile hard disk, a magnetic disk, or an optical disc, and other media that can store program codes.

A possible implementation manner provides a non-transitory computer readable storage medium where computer program instructions are stored. When the computer program instructions are executed by a processor, the neural network quantization method is implemented.

A possible implementation manner provides an artificial intelligence chip including the above-mentioned neural network quantization device.

A possible implementation manner provides a board card including a storage component, an interface device, a control component, and the above-mentioned artificial intelligence chip. The artificial intelligence chip is connected to the storage component, the control component, and the interface device, respectively. The storage component is configured to store data; the interface device is configured to implement data transmission between the artificial intelligence chip and an external equipment; and the control component is configured to monitor a state of the artificial intelligence chip.

Figure 7:
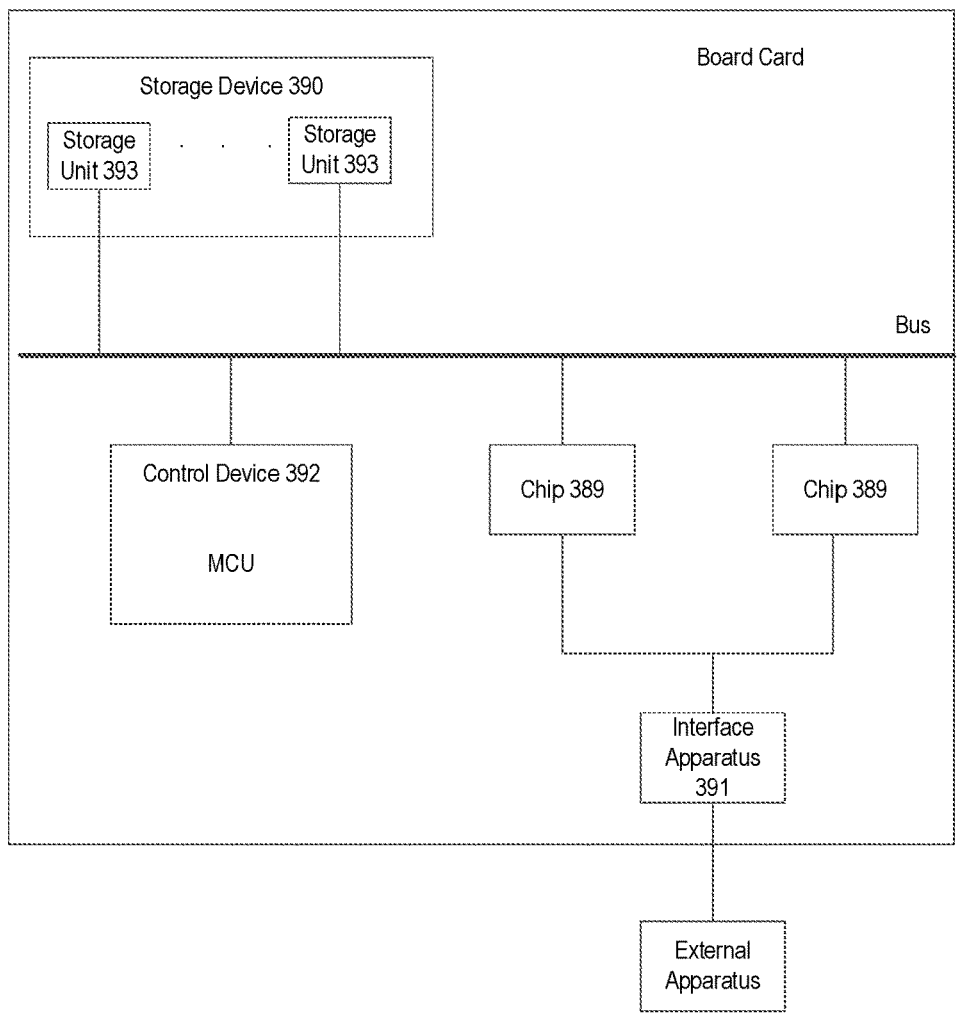
FIG. 7 shows a structural block diagram of a board card according to an embodiment of the present disclosure.

FIG. 7 shows a structural block diagram of a board card according to an embodiment of the present disclosure. Referring to FIG. 7, in addition to the above-mentioned chip 389, the board card may further include other matching components. Other matching components may include but not limited to a storage component 390, an interface device 391, and a control component 392.

The storage component 390 is connected to the artificial intelligence chip through a bus, and is configured to store data. The storage component may include a plurality of groups of storage units 393. Each group of storage units is connected to the artificial intelligence chip through the bus. It can be understood that each group of the storage units may be DDR SDRAM (Double Data Rate SDRAM).

The storage unit 102 in the processor 100 may include one group or a plurality of groups of storage units 393. When the storage unit 102 includes a group of storage units 393, a plurality of processing units 101 share the storage units 393 for data storage. When the storage unit 102 includes a plurality of groups of storage units 393, a dedicated group of storage units 393 may be provided for each processing unit 101, and a group of shared storage units 393 may be provided for some or all of the plurality of processing units 101.

DDR can double the speed of SDRAM without increasing the clock frequency. DDR allows data to be read on the rising and falling edges of the clock pulse. The speed of DDR is twice the speed of standard SDRAM. In an embodiment, the memory device may include 4 groups of storage units. Each group of storage units may include a plurality of DDR4 particles (chips). In an embodiment, four 72-bit DDR4 controllers may be arranged inside the artificial intelligence chip, where 64 bits of each 72-bit DDR4 controller are for data transfer and 8 bits are for ECC parity. It can be understood that when each group of the storage units adopts DDR4-3200 particles, the theoretical bandwidth of data transfer may reach 25600 MB/s.

In an embodiment, each group of the storage units may include a plurality of DDR SDRAMs (Double Data Rate Synchronous Dynamic Random Access Memory) arranged in parallel. DDR can transfer data for two times per clock cycle. A DDR controller may be arranged inside the chip. The DDR controller is configured to control the data transfer and the data storage of each storage unit.

The interface device may be electrically connected to the artificial intelligence chip. The interface device is configured to realize data transmission between the artificial intelligence chip and an external equipment (such as a server or a computer). In an embodiment, the interface device may be a standard PCIE interface. For instance, data to be processed may be transferred by a server through the standard PCIE interface to the chip, thereby realizing data transfer. Alternatively, when a PCIE 3.0×16 interface is adopted for transferring, the theoretical bandwidth may reach 16000 MB/s. In another embodiment, the interface device may also be another interface. The present disclosure does not restrict a specific form of another interface as long as the interface unit can realize the transferring function. In addition, a computation result of the artificial intelligence chip may still be transferred by the interface device to an external equipment (such as a server).

The control component is electrically connected to the artificial intelligence chip. The control component is configured to monitor a state of the artificial intelligence chip. Specifically, the artificial intelligence chip and the control component can be electrically connected through a SPI interface. The control component may include a MCU (Micro Controller Unit). If the artificial intelligence chip includes a plurality of processing chips, a plurality of processing cores, or a plurality of processing circuits, the chip is capable of driving a plurality of loads. In this case, the artificial intelligence chip can be in different working state such as multi-load state and light-load state. The working state of the plurality of processing chips, the plurality of processing cores, or a plurality of processing circuits can be regulated and controlled by the control device.

In a possible implementation manner, an electronic equipment is provided. The electronic equipment includes the artificial intelligence chip. The electronic equipment includes a data processing device, a robot, a computer, a printer, a scanner, a tablet, a smart terminal, a mobile phone, a traffic recorder, a navigator, a sensor, a webcam, a server, a cloud-based server, a camera, a video camera, a projector, a watch, a headphone, a mobile storage, a wearable device, a vehicle, a household appliance, and/or a medical device. The vehicle includes an airplane, a ship, and/or a car; the household electrical appliance may include a television, an air conditioner, a microwave oven, a refrigerator, an electric rice cooker, a humidifier, a washing machine, an electric lamp, a gas cooker, and a range hood; and the medical equipment may include a nuclear magnetic resonance spectrometer, a B-ultrasonic scanner, and/or an electrocardiograph.

In the embodiments above, the description of each embodiment has its own emphasis. For a part that is not described in detail in one embodiment, reference may be made to related descriptions in other embodiments. Each technical features of the embodiments above can be randomly combined. For conciseness, not all possible combinations of the technical features of the embodiments above are described. Yet, provided that there is no contradiction, combinations of these technical features fall within the scope of the description of the present specification.

The foregoing can be better understood according to the following articles:

A1. A neural network quantization method, wherein, for any layer to be quantized in a neural network, the method includes:

according to a storage capacity of a terminal running the neural network, determining a plurality of pieces of data to be quantized in target data of the layer to be quantized, wherein, the target data is any batch of data to be operated in the layer to be quantized and the data to be operated includes at least one of input neurons and/or gradients;

using a loop processing method to quantize each piece of data to be quantized according to a corresponding quantization parameter to obtain a piece of quantized data corresponding to the piece of data to be quantized; and obtaining a quantization result of the target data according to the pieces of quantized data corresponding to the pieces of data to be quantized, so that an operation is performed in the layer to be quantized according to the quantization result of the target data.

A2. The method of Article 1, wherein, the using a loop processing method to quantize each piece of data to be quantized according to a corresponding quantization parameter to obtain a piece of quantized data corresponding to the piece of data to be quantized includes:

after a previous loop processing process ends, starting a current loop processing process, and determining a piece of data to be quantized after a piece of data to be quantized that is quantized in the previous loop processing process as a current piece of data to be quantized that is to be quantized in the current loop processing process, comparing a statistical result of the current piece of data to be quantized with a stored reference statistical result to obtain a comparison result, when the comparison result meets a quantization parameter operation condition, determining an updated statistical result according to the statistical result of the current piece of data to be quantized and the reference statistical result, determining a quantization parameter corresponding to the current piece of data to be quantized according to the updated statistical result and a corresponding data bit width, and quantizing the current piece of data to be quantized according to the corresponding quantization parameter to obtain a piece of quantized data corresponding to the current piece of data to be quantized, and finishing the current loop processing process.

A3. The method of Article 2, wherein, the using a loop processing method to quantize each piece of data to be quantized according to a corresponding quantization parameter to obtain a piece of quantized data corresponding to the piece of data to be quantized further includes:

storing the updated statistical result and a quantization parameter corresponding to the updated statistical result as a new reference statistical result and a new reference quantization parameter, respectively.

A4. The method of Article 2, wherein, the using a loop processing method to quantize each piece of data to be quantized according to a corresponding quantization parameter to obtain a piece of quantized data corresponding to the piece of data to be quantized further includes:

when the comparison result does not meet the quantization parameter operation condition, determining a reference quantization parameter corresponding to the reference statistical result as the quantization parameter of the current piece of data to be quantized.

A5. The method of any of Articles 2-4, wherein, the statistical result of the current piece of data to be quantized includes a maximum value and a minimum value in the current piece of data to be quantized, and the reference statistical result includes a reference maximum value and a reference minimum value, wherein, when the comparison result meets the quantization parameter operation condition, the determining an updated statistical result according to the statistical result of the current piece of data to be quantized and the reference statistical result includes any of the following:

when the maximum value in the current piece of data to be quantized is greater than the reference maximum value, and the minimum value in the current piece of data to be quantized is less than the reference minimum value, determining the statistical result of the current piece of data to be quantized as the updated statistical result, when the maximum value in the current piece of data to be quantized is less than or equal to the reference maximum value, and the minimum value in the current piece of data to be quantized is less than the reference minimum value, determining the reference maximum value and the minimum value in the current piece of data to be quantized as the updated statistical result, and when the maximum value in the current piece of data to be quantized is greater than the reference maximum value, and the minimum value in the current piece of data to be quantized is less than the reference minimum value, determining the maximum value in the current piece of data to be quantized and the reference minimum value as the updated statistical result.

A6. The method of Article 2, wherein, the determining a quantization parameter corresponding to the current piece of data to be quantized according to the updated statistical result and a corresponding data bit width includes:

when the quantization parameter includes an offset, obtaining a second type of point position of the current piece of data to be quantized according to the maximum and the minimum of the updated statistical result and the corresponding data bit width.

A7. The method of Article 2, wherein, the determining a quantization parameter corresponding to the current piece of data to be quantized according to the updated statistical result and a corresponding data bit width includes:

when the quantization parameter includes an offset, obtaining a maximum value of the piece of quantized data according to the current piece of data to be quantized and the corresponding data bit width, and obtaining a second type of scaling factor of the current piece of data to be quantized according to a maximum value and a minimum value in the updated statistical result as well as the maximum value of the piece of quantized data.

A8. The method of Article 2, wherein, the determining a quantization parameter corresponding to the current piece of data to be quantized according to the updated statistical result and a corresponding data bit width includes:

obtaining an offset of the current piece of data to be quantized according to a maximum value and a minimum value in the updated statistical result.

A9. The method of any of Articles 1-8, further comprising:

determining a quantization error corresponding to each piece of data to be quantized according to each piece of data to be quantized and the piece of quantized data corresponding to each piece of data to be quantized, adjusting the data bit width corresponding to each piece of data to be quantized to obtain an adjusted bit width corresponding to each piece of data to be quantized according to the quantization error and an error threshold corresponding to each piece of data to be quantized, and updating the data bit width corresponding to each piece of data to be quantized to the corresponding adjusted bit width, and computing a corresponding adjusted quantization parameter according to each piece of data to be quantized and the corresponding adjusted bit width, so as to quantize each piece of data to be quantized according to the corresponding adjusted quantization parameter.

A10. The method of Article 9, wherein, the adjusting the data bit width corresponding to each piece of data to be quantized to obtain an adjusted bit width corresponding to each piece of data to be quantized according to the quantization error and an error threshold corresponding to each piece of data to be quantized includes:

when the quantization error is greater than a first error threshold, increasing the corresponding data bit width to obtain the corresponding adjusted bit width.

A11. The method of Article 9 or 10, further comprising:
computing an adjusted quantization error of each piece of data to be quantized according to the piece of data to be quantized and the corresponding adjusted bit width; and continuing to increase the corresponding adjusted bit width according to the adjusted quantization error and the first error threshold until the adjusted quantization error is less than or equal to the first error threshold.

A12. The method of Article 9 or 10, wherein, the adjusting the data bit width corresponding to each piece of data to be quantized to obtain an adjusted bit width corresponding to each piece of data to be quantized according to the quantization error and an error threshold corresponding to each piece of data to be quantized includes:

when the quantization error is less than a second error threshold, increasing the corresponding data bit width to obtain the corresponding adjusted bit width, wherein, the second error threshold is less than the first error threshold.

A13. The method of Article 12, further comprising:
computing an adjusted quantization error of each piece of data to be quantized according to the adjusted bit width and the piece of data to be quantized, and continuing to decrease the adjusted bit width according to the adjusted quantization error and the second error threshold until the adjusted quantization error obtained according to the adjusted bit width and the piece of data to be quantized is greater than or equal to the second error threshold.

A14. The method of any of Articles 1-13, wherein, during a fine-tuning stage and/or training stage of the neural network operation, the method further comprises:

obtaining a variation range of data to be quantized in a current iteration and historical iterations, wherein, the historical iterations are iterations before the current iteration, and according to the variation range of the data to be quantized, determining a target iteration interval corresponding to the data to be quantized to enable the layer to be quantized to update a quantization parameter of the data to be quantized according to the target iteration interval, wherein, the target iteration interval includes at least one iteration.

A15. The method of Article 14, further comprising:
according to a data bit width of the data to be quantized in the current iteration, determining a data bit width of the data to be quantized in iterations within the target iteration interval to enable the neural network to determine a quantization parameter according to the data bit width of the data to be quantized in the iterations within the target iteration interval.

A16. The method of Article 15, further comprising:
according to a point position of the data to be quantized in the current iteration, determining a point position of the data to be quantized in the iterations within the target iteration interval, where the point position includes a second type of point position.

A17. The method of Article 14, wherein, the obtaining a variation range of data to be quantized in a current iteration and historical iterations includes:

according to a point position of the data to be quantized in the current iteration and a point position in a historical iteration that corresponds to the current iteration and that is determined according to a historical iteration interval, computing a moving average of the point positions of the data to be quantized in the respective iteration intervals, wherein, the point positions include a second type of point position, and obtaining a first data variation range according to a first moving average of the point position of the data to be quantized in the current iteration and a second moving average of the point position in an iteration corresponding to a previous iteration interval, the according to the variation range of the data to be quantized, determining a target iteration interval corresponding to the data to be quantized to enable the neural network to update a quantization parameter of the data to be quantized according to the target iteration interval includes:

determining the target iteration interval corresponding to the data to be quantized according to the first data variation range to enable the neural network to update the quantization parameter of the data to be quantized according to the target iteration interval.

A18. The method of Article 17, wherein, the obtaining a first data variation range according to a first moving average of the point position of the data to be quantized in the current iteration and a second moving average of the point position in an iteration corresponding to a previous iteration interval includes:

computing a difference between the first moving average and the second moving average, and
determining an absolute value of the difference as the first data variation range.

A19. The method of Article 18, further comprising:
obtaining a second data variation range according to the data to be quantized and the quantized data corresponding to the data to be quantized in the current iteration,
the according to the variation range of the data to be quantized, determining a target iteration interval corresponding to the data to be quantized to enable the neural network to update a quantization parameter of the data to be quantized according to the target iteration interval includes:
determining the target iteration interval corresponding to the data to be quantized according to the first data variation range and the second data variation range of the data to be quantized to enable the neural network to update the quantization parameter of the data to be quantized according to the target iteration interval.

A20. The method of Article 19, wherein, the obtaining a second data variation range according to the data to be quantized and the quantized data corresponding to the data to be quantized in the current iteration includes:
computing an error between the data to be quantized and the quantized data corresponding to the data to be quantized in the current iteration, and
determining a square of the error as the second data variation range.

A21. The method of Article 19, wherein, the determining the target iteration interval corresponding to the data to be quantized according to the first data variation range and the second data variation range of the data to be quantized includes:
determining the target iteration interval corresponding to the data to be quantized according to a maximum value of the first data variation range and the second data variation range.

A22. The method of any of Articles 14-21, wherein, the obtaining a variation range of data to be quantized in a current iteration and historical iterations includes:
when the current iteration is outside an update period, obtaining the data variation range of the data to be quantized in the current iteration and the historical iterations, wherein, the update period includes at least one iteration.

A23. The method of any of Articles 14-22, further comprising:
when the current iteration is within a preset period, determining a period interval according to the current iteration, an iteration corresponding to the current iteration in a next period after the preset period, and an iteration interval corresponding to the current iteration,
determining the data bit width of the data to be quantized in iteration within the period interval according to the data bit width of the data to be quantized in the current iteration, or
determining the point position of the data to be quantized in the iteration within the period interval according to the point position of the data to be quantized in the current iteration.

A24. A neural network quantization device, wherein, for any layer to be quantized in a neural network, the device includes:
a data determination module configured to determine a plurality of pieces of data to be quantized in target data of the layer to be quantized according to a storage capacity of a terminal running the neural network, wherein, the target data is any batch of data to be operated in the layer to be quantized and the data to be operated includes at least one of input neurons and/or gradients;
a data quantization module configured to use a loop processing method to quantize each piece of data to be quantized according to a corresponding quantization parameter to obtain a piece of quantized data corresponding to the piece of data to be quantized; and
a result determination module configured to obtain a quantization result of the target data according to the pieces of quantized data corresponding to the pieces of data to be quantized, so that an operation is performed in the layer to be quantized according to the quantization result of the target data.

A25. The device of Article 24, wherein, the data quantization module includes:
a data to be quantized determination sub-module configured to start a current loop processing process after a previous loop processing process ends, and determine a piece of data to be quantized after a piece of data to be quantized that is quantized in the previous loop processing process as a current piece of data to be quantized that is to be quantized in the current loop processing process,
a comparison sub-module configured to compare a statistical result of the current piece of data to be quantized with a stored reference statistical result to obtain a comparison result,
a statistical result determination sub-module configured to, when the comparison result meets a quantization parameter operation condition, determine an updated statistical result according to the statistical result of the current piece of data to be quantized and the reference statistical result,
a first quantization parameter determination sub-module configured to determine a quantization parameter corresponding to the current piece of data to be quantized according to the updated statistical result and a corresponding data bit width, and
a quantization processing sub-module configured to quantize the current piece of data to be quantized according to the corresponding quantization parameter to obtain a piece of quantized data corresponding to the current piece of data to be quantized, and finish the current loop processing process.

A26. The device of Article 25, wherein, the data quantization module further includes:
a reference data updating module configured to store the updated statistical result and a quantization parameter corresponding to the updated statistical result as a new reference statistical result and a new reference quantization parameter, respectively.

A27. The device of Article 25, wherein, the data quantization module further includes:
a second quantization determination sub-module configured to, when the comparison result does not meet the quantization parameter operation condition, determine a reference quantization parameter corresponding to the reference statistical result as the quantization parameter of the current piece of data to be quantized.

A28. The device of any of Articles 25-27, wherein, the statistical result of the current piece of data to be quantized includes a maximum value and a minimum value in the current piece of data to be quantized, and the reference statistical result includes a reference maximum value and a reference minimum value, wherein, when the comparison result meets the quantization parameter operation condition, the determining an updated statistical result according to the statistical result of the current piece of data to be quantized and the reference statistical result includes any of the following:

when the maximum value in the current piece of data to be quantized is greater than the reference maximum value, and the minimum value in the current piece of data to be quantized is less than the reference minimum value, determining the statistical result of the current piece of data to be quantized as the updated statistical result, when the maximum value in the current piece of data to be quantized is less than or equal to the reference maximum value, and the minimum value in the current piece of data to be quantized is less than the reference minimum value, determining the reference maximum value and the minimum value in the current piece of data to be quantized as the updated statistical result, and when the maximum value in the current piece of data to be quantized is greater than the reference maximum value, and the minimum value in the current piece of data to be quantized is less than the reference minimum value, determining the maximum value in the current piece of data to be quantized and the reference minimum value as the updated statistical result.

A29. The device of Article 25, wherein, the determining a quantization parameter corresponding to the current piece of data to be quantized according to the updated statistical result and a corresponding data bit width includes:

when the quantization parameter includes an offset, obtaining a second type of point position of each piece of data to be quantized according to a maximum value and a minimum value of the updated statistical result and a corresponding data bit width.

A30. The device of Article 25, wherein, the determining a quantization parameter corresponding to the current piece of data to be quantized according to the updated statistical result and a corresponding data bit width includes:

when the quantization parameter includes an offset, obtaining a maximum value of the piece of quantized data according to each piece of data to be quantized and the corresponding data bit width, and obtaining a second type of scaling factor of each piece of data to be quantized according to a maximum value and a minimum value in the updated statistical result as well as a maximum value of the piece of quantized data.

A31. The device of Article 25, wherein, the determining a quantization parameter corresponding to the current piece of data to be quantized according to the updated statistical result and a corresponding data bit width includes:

obtaining an offset of each piece of data to be quantized according to a maximum value and a minimum value in the updated statistical result.

A32. The device of any of Articles 24-31, further comprising:

a first quantization error determination module configured to determine a quantization error corresponding to each piece of data to be quantized according to each piece of data to be quantized and the piece of quantized data corresponding to each piece of data to be quantized, an adjusting bit width determination module configured to adjust the data bit width of each piece of data to be quantized to obtain an adjusted bit width corresponding to each piece of data to be quantized according to the quantization error and an error threshold corresponding to each piece of data to be quantized, and an adjusting quantization parameter determination module configured to update the data bit width corresponding to each piece of data to be quantized to the corresponding adjusted bit width, and compute a corresponding adjusted quantization parameter according to each piece of data to be quantized and the corresponding adjusted bit width to quantize each piece of data to be quantized according to the corresponding adjusted quantization parameter.

A33. The device of Article 32, wherein, the adjusting bit width determination module includes:

a first adjusting bit width determination sub-module configured to, when the quantization error is greater than a first error threshold, increase the corresponding data bit width to obtain the corresponding adjusted bit width.

A34. The device of Article 32 or 33, further comprising:

a first adjusted quantization error module configured to compute an adjusted quantization error of each piece of data to be quantized according to the piece of data to be quantized and the corresponding adjusted bit width, and a first adjusting bit width loop determination module configured to continue to increase the corresponding adjusted bit width according to the adjusted quantization error and the first error threshold until the adjusted quantization error is less than or equal to the first error threshold.

A35. The device of Article 32 or 33, wherein, the adjusting bit width determination module includes:

a second adjusting bit width determination sub-module configured to, when the quantization error is less than a second error threshold, increase the corresponding data bit width to obtain the corresponding adjusted bit width, where the second error threshold is less than the first error threshold.

A36. The device of Article 35, further comprising:

a second adjusted quantization error module configured to compute the adjusted quantization error of the data to be quantized according to the adjusted bit width and the data to be quantized, and a second adjusting bit width loop determination module configured to continue to decrease the adjusted bit width according to the adjusted quantization error and the second error threshold until the adjusted quantization error obtained according to the adjusted bit width and the data to be quantized is greater than or equal to the second error threshold.

A37. The device of any of Articles 24-36, wherein, during a fine-tuning stage and/or training stage of the neural network operation, the device further comprises:

a first data variation range determination module configured to obtain a variation range of the data to be quantized in a current iteration and historical iterations, wherein, the historical iterations are the iterations before the current iteration, and a target iteration interval determination module configured to, according to the variation range of the data to be quantized, determine a target iteration interval corresponding to the data to be quantized to enable the layer to be quantized to update the quantization parameter of the data to be quantized according to the target iteration interval, wherein, the target iteration interval includes at least one iteration.

A38. The device of Article 37, further comprising:
a first target iteration interval application module configured to, according to the data bit width of the data to be quantized in the current iteration, determine the data bit width of the data to be quantized in the iterations within the target iteration interval to enable the neural network to determine the quantization parameter according to the data bit width of the data to be quantized in the iterations within the target iteration interval.

A39. The device of Article 38, further comprising:
a second target iteration interval application module configured to, according to a point position of the data to be quantized in the current iteration, determine a point position of the data to be quantized in the iterations within the target iteration interval, wherein, the point position includes a second type of point position.

A40. The device of Article 37, wherein, the first data variation range determination module includes:
a moving average computation sub-module configured to, according to the point position of the data to be quantized in the current iteration and a point position in a historical iteration that corresponds to the current iteration and that is determined according to a historical iteration interval, compute a moving average of the point positions of the data to be quantized in the respective iteration intervals, wherein, the point position includes a second type of point position, and
a first data variation range determination sub-module configured to obtain a first data variation range according to a first moving average of the point position of the data to be quantized in the current iteration and a second moving average of the point position in an iteration corresponding to a previous iteration interval, wherein,
the target iteration interval determination module includes:
a first target iteration interval determination sub-module configured to determine the target iteration interval corresponding to the data to be quantized according to the first data variation range to enable the neural network to update the quantization parameter of the data to be quantized according to the target iteration interval.

A41. The device of Article 40, wherein, the first data variation range determination sub-module includes:
a first range determination sub-module configured to compute a difference between the first moving average and the second moving average, and determine the absolute value of the difference as the first data variation range.

A42. The device of Article 41, further comprising:
a second data variation range determination module configured to obtain a second data variation range according to the data to be quantized and the quantized data corresponding to the data to be quantized in the current iteration, wherein,
the target iteration interval determination module further includes:
a second target iteration interval determination sub-module configured to determine the target iteration interval corresponding to the data to be quantized according to the first data variation range and the second data variation range of the data to be quantized to enable the neural network to update the quantization parameter of the data to be quantized according to the target iteration interval.

A43. The device of Article 42, wherein, the second data variation range determination module includes:
a second range determination sub-module configured to compute an error between the data to be quantized and the quantized data corresponding to the data to be quantized in the current iteration, and determine a square of the error as the second data variation range.

A44. The device of Article 42, wherein, the second target iteration interval determination sub-module includes:
a range determination sub-module configured to determine the target iteration interval corresponding to the data to be quantized according to a maximum value of the first data variation range and the second data variation range.

A45. The device of any of Articles 37-44, wherein, the first data variation range determination module includes:
a second data variation range determination sub-module configured to, when the current iteration is outside an update period, obtain the data variation range of the data to be quantized in the current iteration and the historical iterations, wherein, the update period includes at least one iteration.

A46. The device of any of Articles 37-45, further comprising:
a period interval determination module configured to, when the current iteration is within a preset period, determine a period interval according to the current iteration, an iteration corresponding to the current iteration in a next period after the preset period, and an iteration interval corresponding to the current iteration,
a first period interval application module configured to determine the data bit width of the data to be quantized in the iteration within the period interval according to the data bit width of the data to be quantized corresponding to the current iteration, or
a second period interval application module configured to determine the point position of the data to be quantized in the iteration within the period interval according to the point position of the data to be quantized corresponding to the current iteration.

A47. An artificial intelligence chip comprising the neural network quantization device of any of Articles 24-46.

A48. An electronic equipment comprising the artificial intelligence chip of Article 47.

A49. A board card comprising a storage component, an interface device, a control component, and the artificial intelligence chip of Article 47, wherein
the artificial intelligence chip is connected to the storage component, the control component, and the interface device, respectively;
the storage component is configured to store data;
the interface device is configured to implement data transfer between the artificial intelligence chip and an external equipment;
the control component is configured to monitor a state of the artificial intelligence chip.

A50. The board card of Article 49, wherein,
the storage component includes: a plurality groups of storage units, wherein, each group of storage units is connected to the artificial intelligence chip through a bus, and the storage units are DDR SDRAM,
the chip includes a DDR controller configured to control data transfer and data storage of each storage unit, and the interface device is a standard PCIE interface.

A51. A non-volatile computer readable storage medium, wherein, a computer program instruction is stored in the non-volatile computer readable storage medium, and when the computer program instruction is executed by a processor, the computer program instruction implements the neural network quantization method of any of Articles 1-23.

The embodiments of the present disclosure have been described in detail above. Specific examples have been used in the specification to explain the principles and implementation manners of the present disclosure. The descriptions of the above embodiments are only used to facilitate understanding of the methods and core ideas of the present disclosure. Persons of ordinary skill in the art may change or transform the implementation and application scope according to the ideas of the present application. The changes and transformations shall all fall within the protection scope of the present disclosure. In summary, the content of this specification should not be construed as a limitation on the present disclosure.

The invention claimed is:

1. A neural network quantization method, wherein, for a layer to be quantized in a neural network, the method comprises:
   according to a storage capacity of a terminal running the neural network, determining a plurality of pieces of data to be quantized in target data of the layer to be quantized, wherein, the target data is a batch of data to be operated on the layer to be quantized and the batch of data to be operated includes at least one of input neurons and/or gradients;
   quantizing each piece of data to be quantized using a loop processing method according to a corresponding quantization parameter to obtain a piece of quantized data corresponding to the piece of data to be quantized;
   obtaining a quantization result of the target data from the pieces of quantized data corresponding to the pieces of data to be quantized, so that an operation is performed in the layer to be quantized according to the quantization result of the target data;
   determining a quantization error corresponding to each piece of data to be quantized, adjusting the data bit width corresponding to each piece of data to be quantized to obtain an adjusted bit width corresponding to each piece of data to be quantized according to the quantization error and an error threshold corresponding to each piece of data to be quantized; and
   updating the data bit width corresponding to each piece of data to be quantized to the corresponding adjusted bit width, and computing a corresponding adjusted quantization parameter according to each piece of data to be quantized and the corresponding adjusted bit width, to quantize each piece of data to be quantized according to the corresponding adjusted quantization parameter;
   wherein, the adjusting the data bit width corresponding to each piece of data to be quantized to obtain an adjusted bit width corresponding to each piece of data to be quantized according to the quantization error and an error threshold corresponding to each piece of data to be quantized includes:
   when the quantization error is greater than a first error threshold, increasing the corresponding data bit width to obtain the corresponding adjusted bit width.

2. The method of claim 1, wherein, the quantizing each piece of data to be quantized using a loop processing method according to a corresponding quantization parameter to obtain a piece of quantized data corresponding to the piece of data to be quantized includes:
   after a previous loop processing process ends, starting a current loop processing process, and determining a piece of data to be quantized after a piece of data is quantized in the previous loop processing process as a current piece of data to be quantized in the current loop processing process,
   comparing a statistical result of the current piece of data to be quantized with a stored reference statistical result to obtain a comparison result, wherein the statistical result of the current piece of data comprises a maximum or a minimum of the piece of data over a plurality of loop processing processes,
   when the comparison result meets a quantization parameter operation condition, determining an updated statistical result according to the statistical result of the current piece of data to be quantized and the reference statistical result,
   determining a quantization parameter corresponding to the current piece of data to be quantized according to the updated statistical result and a corresponding data bit width, and quantizing the current piece of data to be quantized according to the corresponding quantization parameter to obtain a piece of quantized data corresponding to the current piece of data to be quantized, and finishing the current loop processing process.

3. The method of claim 2, wherein, the quantizing each piece of data to be quantized using a loop processing method according to a corresponding quantization parameter to obtain a piece of quantized data corresponding to the piece of data to be quantized further includes:
   storing the updated statistical result and a quantization parameter corresponding to the updated statistical result as a new reference statistical result and a new reference quantization parameter, respectively; and
   when the comparison result does not meet the quantization parameter operation condition, determining a reference quantization parameter corresponding to the reference statistical result as the quantization parameter of the current piece of data to be quantized.

4. The method of claim 2, wherein, the statistical result of the current piece of data to be quantized includes a maximum value and a minimum value in the current piece of data to be quantized, and the reference statistical result includes a reference maximum value and a reference minimum value, wherein,
   when the comparison result meets the quantization parameter operation condition, the determining an updated statistical result according to the statistical result of the current piece of data to be quantized and the reference statistical result includes any of the following:
   when the maximum value in the current piece of data to be quantized is greater than the reference maximum value, and the minimum value in the current piece of data to be quantized is less than the reference minimum value, determining the statistical result of the current piece of data to be quantized as the updated statistical result,
   when the maximum value in the current piece of data to be quantized is less than or equal to the reference maximum value, and the minimum value in the current piece of data to be quantized is less than the reference minimum value, determining the reference maximum value and the minimum value in the current piece of data to be quantized as the updated statistical result, or when the maximum value in the current piece of data to be quantized is greater than the reference maximum value, and the minimum value in the current piece of data to be quantized is less than the reference minimum value, determining the maximum value in the current piece of data to be quantized and the reference minimum value as the updated statistical result.

5. The method of claim 2, wherein, the determining a quantization parameter corresponding to the current piece of data to be quantized according to the updated statistical result and a corresponding data bit width includes:

when the quantization parameter includes an offset of the current piece of data to be quantized, obtaining a second type of point position of the current piece of data to be quantized according to the maximum and the minimum of the updated statistical result and the corresponding data bit width; or when the quantization parameter includes an offset of the current piece of data to be quantized, obtaining a maximum value of the piece of quantized data according to the current piece of data to be quantized and the corresponding data bit width, and obtaining a second type of scaling factor of the current piece of data to be quantized according to the maximum value and the minimum value in the updated statistical result as well as the maximum value of the piece of quantized data; or obtaining an offset of the current piece of data to be quantized according to the maximum value and the minimum value in the updated statistical result.

6. The method of claim 1, further comprising:

computing an adjusted quantization error of each piece of data to be quantized according to the piece of data to be quantized and the corresponding adjusted bit width; and continuing to increase the corresponding adjusted bit width according to the adjusted quantization error and the first error threshold until the adjusted quantization error is less than or equal to the first error threshold;

wherein, the adjusting the data bit width corresponding to each piece of data to be quantized to obtain an adjusted bit width corresponding to each piece of data to be quantized according to the quantization error and an error threshold corresponding to each piece of data to be quantized includes:

when the quantization error is less than a second error threshold, increasing the corresponding data bit width to obtain the corresponding adjusted bit width, wherein, the second error threshold is less than the first error threshold.

7. The method of claim 6, further comprising:

computing an adjusted quantization error of each piece of data to be quantized according to the adjusted bit width and the piece of data to be quantized, and continuing to decrease the adjusted bit width according to the adjusted quantization error and the second error threshold until the adjusted quantization error is greater than or equal to the second error threshold.

8. A neural network quantization device, wherein, for any layer to be quantized in a neural network, the device comprises:

a data determination circuit configured to determine a plurality of pieces of data to be quantized in target data of the layer to be quantized according to a storage capacity of a terminal running the neural network, wherein, the target data is any batch of data to be operated on the layer to be quantized and the data to be operated includes at least one of input neurons and/or gradients;

a data quantization circuit configured to quantize each piece of data to be quantized using a loop processing method to according to a corresponding quantization parameter to obtain a piece of quantized data corresponding to the piece of data to be quantized;

a result determination circuit configured to obtain a quantization result from the target data according to the pieces of quantized data corresponding to the pieces of data to be quantized, so that an operation is performed in the layer to be quantized according to the quantization result of the target data;

a first quantization error determination circuit configured to determine a quantization error corresponding to each piece of data to be quantized, an adjusting bit width determination circuit configured to adjust the data bit width of each piece of data to be quantized to obtain an adjusted bit width corresponding to each piece of data to be quantized according to the quantization error and an error threshold corresponding to each piece of data to be quantized, and an adjusting quantization parameter determination circuit configured to update the data bit width corresponding to each piece of data to be quantized to the corresponding adjusted bit width, and compute a corresponding adjusted quantization parameter according to each piece of data to be quantized and the corresponding adjusted bit width to quantize each piece of data to be quantized according to the corresponding adjusted quantization parameter;

wherein, the adjusting bit width determination circuit includes:

a first adjusting bit width determination sub-circuit configured to, when the quantization error is greater than a first error threshold, increase the corresponding data bit width to obtain the corresponding adjusted bit width.

9. The device of claim 8, wherein, the data quantization circuit includes:

a data-to-be-quantized-determination sub-circuit configured to start a current loop processing process after a previous loop processing process ends, and determine a piece of data to be quantized after a piece of data to be quantized that is quantized in the previous loop processing process as a current piece of data to be quantized that is to be quantized in the current loop processing process, a comparison sub-circuit configured to compare a statistical result of the current piece of data to be quantized with a stored reference statistical result to obtain a comparison result, wherein the statistical result of the current piece of data comprises a maximum or a minimum of the piece of data over a plurality of loop processing processes, a statistical result determination sub-circuit configured to, when the comparison result meets a quantization parameter operation condition, determine an updated statistical result according to the statistical result of the current piece of data to be quantized and the reference statistical result, a first quantization parameter determination sub-circuit configured to determine a quantization parameter corresponding to the current piece of data to be quantized according to the updated statistical result and a corresponding data bit width, and a quantization processing sub-circuit configured to quantize the current piece of data to be quantized according to the corresponding quantization parameter to obtain a piece of quantized data corresponding to the current piece of data to be quantized, and finish the current loop processing process.

10. The device of claim 9, wherein, the data quantization circuit further includes:
a reference data updating sub-circuit configured to store the updated statistical result and a quantization parameter corresponding to the updated statistical result as a new reference statistical result and a new reference quantization parameter, respectively; and
a second quantization determination sub-circuit configured to, when the comparison result does not meet the quantization parameter operation condition, determine a reference quantization parameter corresponding to the reference statistical result as the quantization parameter of the current piece of data to be quantized.

11. The device of claim 9, wherein, the statistical result of the current piece of data to be quantized includes a maximum value and a minimum value in the current piece of data to be quantized, and the reference statistical result includes a reference maximum value and a reference minimum value, wherein,
when the comparison result meets the quantization parameter operation condition, the determining an updated statistical result according to the statistical result of the current piece of data to be quantized and the reference statistical result includes any of the following:
when the maximum value in the current piece of data to be quantized is greater than the reference maximum value, and the minimum value in the current piece of data to be quantized is less than the reference minimum value, determining the statistical result of the current piece of data to be quantized as the updated statistical result,
when the maximum value in the current piece of data to be quantized is less than or equal to the reference maximum value, and the minimum value in the current piece of data to be quantized is less than the reference minimum value, determining the reference maximum value and the minimum value in the current piece of data to be quantized as the updated statistical result, or
when the maximum value in the current piece of data to be quantized is greater than the reference maximum value, and the minimum value in the current piece of data to be quantized is less than the reference minimum value, determining the maximum value in the current piece of data to be quantized and the reference minimum value as the updated statistical result.

12. The device of claim 9, wherein, the determining a quantization parameter corresponding to the current piece of data to be quantized according to the updated statistical result and a corresponding data bit width includes:
when the quantization parameter includes an offset of the current piece of data to be quantized, obtaining a second type of point position of each piece of data to be quantized according to a maximum value and a minimum value of the updated statistical result and a corresponding data bit width; or
when the quantization parameter includes an offset of the current piece of data to be quantized, obtaining a maximum value of the piece of quantized data according to each piece of data to be quantized and the corresponding data bit width, and obtaining a second type of scaling factor of each piece of data to be quantized according to the maximum value and the minimum value in the updated statistical result as well as a maximum value of the piece of quantized data; or
obtaining an offset of each piece of data to be quantized according to the maximum value and the minimum value in the updated statistical result.

13. The device of claim 8, further comprising:
a first adjusted quantization error circuit configured to compute an adjusted quantization error of each piece of data to be quantized according to the piece of data to be quantized and the corresponding adjusted bit width, and
a first adjusting bit width loop determination circuit configured to continue to increase the corresponding adjusted bit width according to the adjusted quantization error and the first error threshold until the adjusted quantization error is less than or equal to the first error threshold;
wherein, the adjusting bit width determination circuit includes:
a second adjusting bit width determination sub-circuit configured to, when the quantization error is less than a second error threshold, increase the corresponding data bit width to obtain the corresponding adjusted bit width, where the second error threshold is less than the first error threshold.

14. The device of claim 13, further comprising:
a second adjusted quantization error circuit configured to compute the adjusted quantization error of the data to be quantized according to the adjusted bit width and the data to be quantized, and
a second adjusting bit width loop determination circuit configured to continue to decrease the adjusted bit width according to the adjusted quantization error and the second error threshold until the adjusted quantization error is greater than or equal to the second error threshold.

15. An artificial intelligence chip comprising the neural network quantization device of claim 8.

16. A non-transitory computer readable storage medium, wherein, a computer program instruction is stored in the non-volatile computer readable storage medium, and when the computer program instruction is executed by a processor, the computer program instruction implements the neural network quantization method of claim 1.

* * * * *